United States Patent
Kim et al.

(10) Patent No.: US 9,386,324 B2
(45) Date of Patent: Jul. 5, 2016

(54) IMAGE ENCODING/DECODING APPARATUS AND METHOD USING MULTI-DIMENSIONAL INTEGER TRANSFORM

(75) Inventors: Sunyeon Kim, Seoul (KR); Joohee Moon, Seoul (KR); Yunglyul Lee, Seoul (KR); Haekwang Kim, Seoul (KR); Byeungwoo Jeon, Seongnam-si (KR); Mincheol Park, Bucheon-si (KR); Dongwon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 904 days.

(21) Appl. No.: 13/380,725

(22) PCT Filed: Jun. 22, 2010

(86) PCT No.: PCT/KR2010/004015
§ 371 (c)(1),
(2), (4) Date: Dec. 23, 2011

(87) PCT Pub. No.: WO2010/151018
PCT Pub. Date: Dec. 29, 2010

(65) Prior Publication Data
US 2012/0106631 A1    May 3, 2012

(30) Foreign Application Priority Data
Jun. 26, 2009    (KR) .................. 10-2009-0057907

(51) Int. Cl.
*H04N 19/61*    (2014.01)
*H04N 19/147*    (2014.01)
*H04N 19/122*    (2014.01)

(52) U.S. Cl.
CPC ......... *H04N 19/61* (2014.11); *H04N 19/00175* (2013.01); *H04N 19/122* (2014.11)

(58) Field of Classification Search
CPC .............................................. H04N 19/00175

USPC ....................... 375/240.03, 240.12
See application file for complete search history.

(56) References Cited

U.S. PATENT DOCUMENTS

2004/0233990 A1* 11/2004 Sekiguchi et al. ....... 375/240.16
2005/0053299 A1    3/2005 Fuchs et al.
(Continued)

FOREIGN PATENT DOCUMENTS

CN         101415121 A    4/2009
KR    10-2005-0045746    5/2005
(Continued)

OTHER PUBLICATIONS

International Search Report mailed Jan. 24, 2011 for PCT/KR2010/004015.
Chinese Office Action dated Sep. 3, 2014.

*Primary Examiner* — Tung Vo
*Assistant Examiner* — Rowina Cattungal
(74) *Attorney, Agent, or Firm* — Hauptman Ham, LLP

(57) ABSTRACT

The present disclosure relates to a video encoding/decoding apparatus and method using a multi-dimensional integer transform. The video encoding method of the present disclosure includes: decomposing subblocks in units of a rectangular block and successively encoding rectangular block units to output a rectangularly encoded bitstream of each subblock; encoding the subblocks in units of a square block to output a squarely encoded bitstream of each subblock; calculating an encoding cost involving at least one rectangularly encoded bitstream; calculating an encoding cost not involving the rectangularly encoded bitstream; and on the basis of the calculations, using one or more of the squarely encoded bitstream and the rectangularly encoded bitstream to generate and output the bitstream of the macroblock. According to the disclosure, since the coding scheme for encoding or decoding a video with a higher efficiency is selectively determined, the prediction accuracy can increase and thereby improve the video encoding efficiency.

18 Claims, 22 Drawing Sheets

(56) References Cited

U.S. PATENT DOCUMENTS

| | | | |
|---|---|---|---|
| 2008/0152000 A1* | 6/2008 | Kaushik | 375/240.03 |
| 2010/0086029 A1* | 4/2010 | Chen et al. | 375/240.12 |
| 2010/0086030 A1* | 4/2010 | Chen et al. | 375/240.12 |
| 2010/0086031 A1* | 4/2010 | Chen et al. | 375/240.12 |
| 2010/0086032 A1* | 4/2010 | Chen et al. | 375/240.12 |

FOREIGN PATENT DOCUMENTS

| | | |
|---|---|---|
| KR | 10-2005-0047373 | 5/2006 |
| KR | 10-2008-0068276 A | 7/2008 |
| KR | 10-2008-0070478 | 7/2008 |
| KR | 10-2008-0102947 | 11/2008 |

* cited by examiner

4×4 BLOCK MODE

| $DC(0)$ | $AC_1(0)$ | $AC_2(0)$ | $AC_3(0)$ |
|---|---|---|---|
| $DC(1)$ | $AC_1(1)$ | $AC_2(1)$ | $AC_3(1)$ |
| $DC(2)$ | $AC_1(2)$ | $AC_2(2)$ | $AC_3(2)$ |
| $DC(3)$ | $AC_1(3)$ | $AC_2(3)$ | $AC_3(3)$ |

8×8 BLOCK MODE

| $DC(0)$ | $AC_1(0)$ | $AC_2(0)$ | $AC_3(0)$ | $AC_4(0)$ | $AC_5(0)$ | $AC_6(0)$ | $AC_7(0)$ |
|---|---|---|---|---|---|---|---|
| $DC(1)$ | $AC_1(1)$ | $AC_2(1)$ | $AC_3(1)$ | $AC_4(1)$ | $AC_5(1)$ | $AC_6(1)$ | $AC_7(1)$ |
| $DC(2)$ | $AC_1(2)$ | $AC_2(2)$ | $AC_3(2)$ | $AC_4(2)$ | $AC_5(2)$ | $AC_6(2)$ | $AC_7(2)$ |
| $DC(3)$ | $AC_1(3)$ | $AC_2(3)$ | $AC_3(3)$ | $AC_4(3)$ | $AC_5(3)$ | $AC_6(3)$ | $AC_7(3)$ |
| $DC(4)$ | $AC_1(4)$ | $AC_2(4)$ | $AC_3(4)$ | $AC_4(4)$ | $AC_5(4)$ | $AC_6(4)$ | $AC_7(4)$ |
| $DC(5)$ | $AC_1(5)$ | $AC_2(5)$ | $AC_3(5)$ | $AC_4(5)$ | $AC_5(5)$ | $AC_6(5)$ | $AC_7(5)$ |
| $DC(6)$ | $AC_1(6)$ | $AC_2(6)$ | $AC_3(6)$ | $AC_4(6)$ | $AC_5(6)$ | $AC_6(6)$ | $AC_7(6)$ |
| $DC(7)$ | $AC_1(7)$ | $AC_2(7)$ | $AC_3(7)$ | $AC_4(7)$ | $AC_5(7)$ | $AC_6(7)$ | $AC_7(7)$ |

*FIG.12*

STEP 1
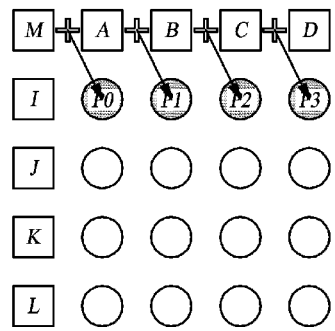
STEP 2
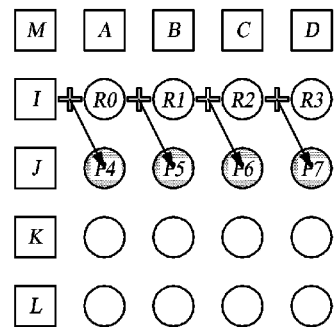
STEP 3
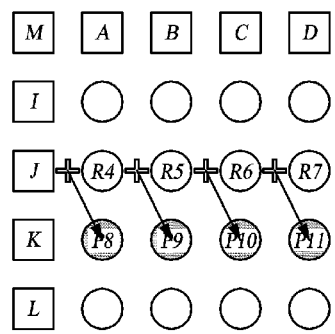
STEP 4
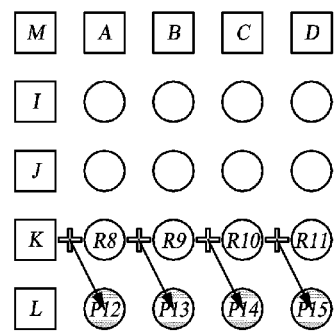
☐ Locations of neighboring block adjacent pixels reconstructed    ✦ Locations of interpolated half pixels    ○ Locations of pixels in 4×4 current block
*FIG.22*

IMAGE ENCODING/DECODING APPARATUS AND METHOD USING MULTI-DIMENSIONAL INTEGER TRANSFORM

CROSS REFERENCE TO RELATED APPLICATION

This application claims the priority of Korean Patent Application No. 10-2009-0057907, filed on Jun. 26, 2009 in the KIPO (Korean Intellectual Property Office). Further, this application is the National Phase application of International Application No. PCT/KP2010/004015 filed Jun. 22, 2010, which designates the United States and was published in Korean.

TECHNICAL FIELD

The present disclosure relates to a video encoding/decoding apparatus and method using a multi-dimensional integer transform. More particularly, the present invention relates to an apparatus and method in the field of encoding/decoding videos for selectively deciding a coding scheme with the use of one-dimensional and two-dimensional integer transforms and thereby increasing the accuracy of prediction and improving coding efficiency of the videos.

BACKGROUND ART

The statements in this section merely provide background information related to the present disclosure and may not constitute the prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264. Such H.264/AVC (hereinafter abbreviated to 'H.264') uses a spatial predictive coding method, which is different from conventional video coding international standards such as MPEG-1, MPEG-2, MPEG-4 Part2 Visual and the like.

Conventional video coding methods use "intra prediction" for coefficients transformed in Discrete Cosine Transform Domain (or DCT Domain) in pursuit of higher encoding efficiency, resulting in degradation of the subjective video quality at low band transmission bit rates. However, H.264 adopts an encoding method based on a spatial intra prediction in a spatial domain rather than in a transform domain.

Encoders using an encoding method based on the conventional spatial intra predictions predict a block to be currently encoded from information of the previously encoded and reconstructed previous blocks, encode information on just the difference of the predicted block from the current block to be encoded, and transmit the encoded information to a decoder. At the same time, the encoder may transmit parameters needed for prediction of the block to the decoder, or the encoder and decoder may be synchronized so that they may share the needed parameters for the decoder to predict the block. At the decoder, the desired block to currently decode is generated and reconstructed by first predicting its neighboring blocks reproduced previously upon completing their decoding and then obtaining the sum of difference information or residual data transmitted from the encoder and the predicted neighboring block information. At this time, again, if the parameters needed for the prediction are transmitted from the encoder, the decoder uses the corresponding one of the parameters in predicting the neighboring block information.

On the other hand, the conventional encoding method based on spatial intra prediction uses square block modes only. This is because a two-dimensional square transform, such as 4×4 transform, 8×8 transform, or the like, is used to improve the transform efficiency. However, when only the square block modes are used, pixels in right and lower portions of a block are predicted from pixels which are spatially far apart, causing the accuracy of prediction of the block to be degraded.

DISCLOSURE

Technical Problem

Therefore, in view of the above-mentioned problems, the present disclosure proposes to improve the accuracy of prediction and accordingly the video encoding efficiency by using one-dimensional and two-dimensional integer transforms and thereby selectively deciding a coding scheme.

Technical Solution

An aspect of the present disclosure provides an apparatus for encoding a video in units of a macroblock, including: a rectangular encoder responsive to an input of each subblock of the macroblock for decomposing said each subblock in units of a rectangular block and successively encoding rectangular block units to output a rectangularly encoded bitstream of said each subblock; a square encoder responsive to an input of each subblock of the macroblock for encoding said each subblock in units of a square block to output a squarely encoded bitstream of said each subblock; and an encoding selector for using one or more of the squarely encoded bitstream of said each subblock and the rectangularly encoded bitstream of said each subblock to generate and output a bitstream of the macroblock on the basis of a cost for encoding with the bitstream of the macroblock including at least one rectangularly encoded bitstream and a cost for encoding without the bitstream of the macroblock including the rectangularly encoded bitstream.

Another aspect of the present disclosure provides a method for decoding a video in units of a macroblock, including: if each subblock of the macroblock is inputted, decomposing said each subblock in units of a rectangular block and successively encoding rectangular block units to output a rectangularly encoded bitstream of said each subblock; if each subblock of the macroblock is inputted, encoding said each subblock in units of a square block to output a squarely encoded bitstream of said each subblock; calculating an encoding cost when a bitstream of the macroblock includes at least one rectangularly encoded bitstream; calculating an encoding cost when the bitstream of the macroblock does not include the rectangularly encoded bitstream; and using one or more of the squarely encoded bitstream of said each subblock and the rectangularly encoded bitstream of said each subblock to generate and output the bitstream of the macroblock on the basis of costs for encoding with and without the bitstream of the macroblock including the rectangularly encoded bitstream.

Yet another aspect of the present disclosure provides an apparatus for decoding a video in units of a macroblock, including: a prediction mode extraction unit for extracting a prediction mode bit from a bitstream; a decoding unit for decoding the bitstream to extract quantized frequency coefficients by respective subblocks; a rectangular reconstruction unit for reconstructing a current block of the video in units of a rectangular block successively according to a prediction mode identified by the prediction mode bit by using the quantized frequency coefficients; a square reconstruction unit for reconstructing and outputting the current block in units of a square block according to the prediction mode identified by the prediction mode bit by using the quantized frequency coefficients in a string; and a bitstream identifier extraction unit for extracting a macroblock mode bit and a block mode bit from the bitstream, and on the basis of an extracted macroblock mode bit and an extracted block mode bit, for controlling the decoding unit to output the quantized frequency coefficients by the respective subblocks to either the rectangular reconstruction unit or the square reconstruction unit.

Yet another aspect of the present disclosure provides a method for decoding a video in units of a macroblock, including: extracting a macroblock mode bit and a block mode bit from a bitstream; extracting a prediction mode bit from the bitstream; decoding the bitstream to extract quantized frequency coefficients by respective subblocks; and on the basis of the macroblock mode bit and the block mode bit both having been extracted, using the quantized frequency coefficients having been extracted by the respective subblocks to reconstruct and output subblocks of the macroblock in units of a rectangular block successively according to a prediction mode identified by the prediction mode bit or using the quantized frequency coefficients having been extracted by the respective subblocks to reconstruct and output the subblocks of the macroblock in units of a square block according to the prediction mode identified by the prediction mode bit.

Advantageous Effects

As mentioned above, according to the present disclosure, since a high-efficiency encoding scheme may be selectively determined when encoding or decoding a video, the prediction accuracy is increased thereby improve the video encoding efficiency.

DESCRIPTION OF DRAWINGS

FIG. 12 is a diagram illustrating a plurality of rectangular residual blocks combined into a square residual block according to a preferred aspect;

FIG. 22 is a diagram illustrating a process of predicting the rectangular block by using half pixels according to another aspect.

MODE FOR INVENTION

Figure 1:
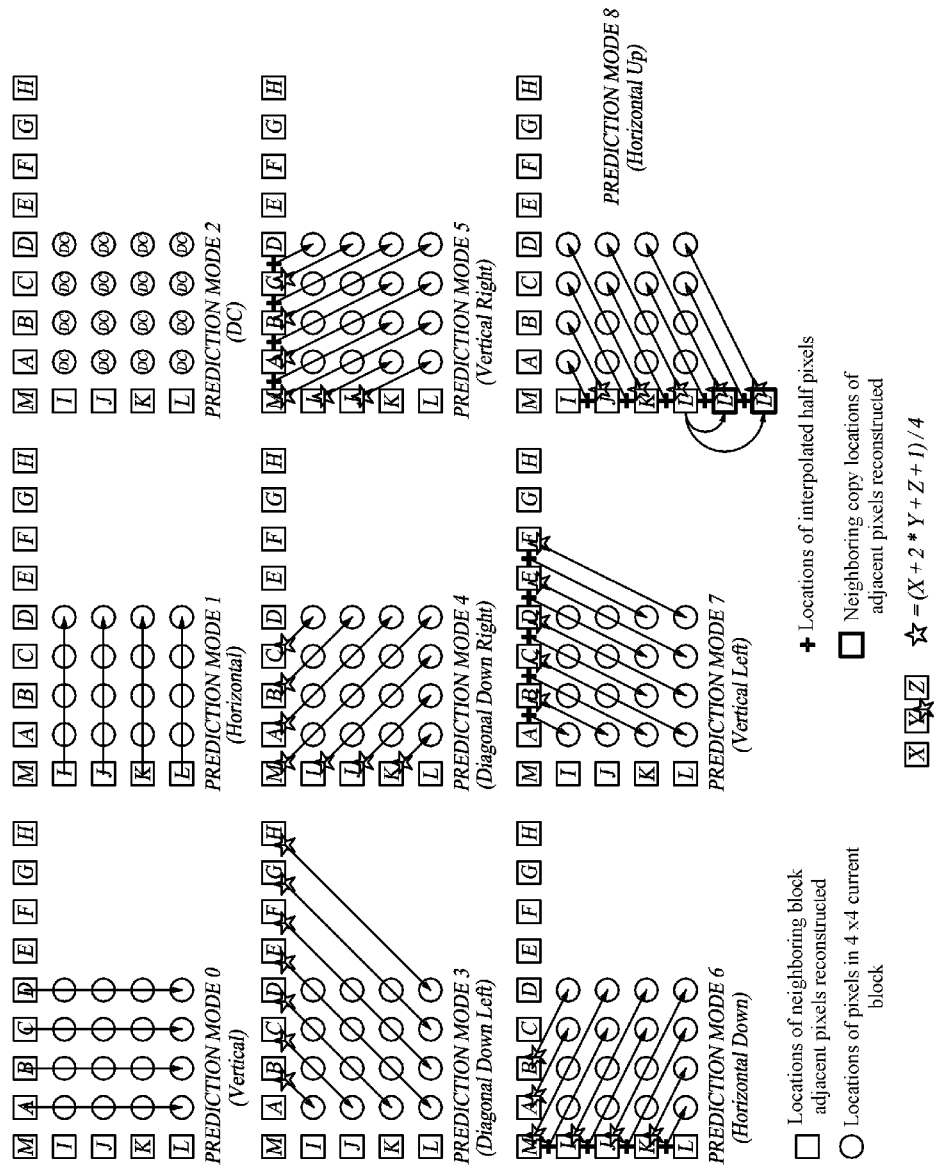
FIG. 1 is an exemplary diagram illustrating typical nine 4×4 intra prediction modes.

Hereinafter, a few aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, the components are not only meant to be directly 'connected', 'coupled', or 'linked' but also are indirectly 'connected', 'coupled', or 'linked' via a third component.

In the following description of the present disclosure, the video encoding apparatus and the video decoding apparatus are assumed to perform encoding or decoding by the unit of macroblock or its lower subblock. However, this assumption is just exemplary, and the video encoding apparatus and the video decoding apparatus may encode or decode images by the unit of ordinary or atypical area of the image. Additionally, in the course of describing an aspect, 16×16 size of macroblocks and 4×4 size of subblocks will be used. However, these sizes of macroblocks and subblocks are illustrative purpose only and other various sizes of macroblocks of 32×32 or 64×64 and subblocks of 8×8 or 16×16 may be used.

FIG. 1 is an exemplary diagram illustrating typical 9 different 4×4 intra prediction modes.

Examples of intra prediction include an intra_4×4 prediction, intra_16×16 prediction, intra_8×8 prediction, and the like, and each intra prediction includes a plurality of prediction modes. FIG. 1 shows nine different prediction modes in the intra_4×4 prediction.

Referring to FIG. 1, the intra_4×4 prediction has nine different prediction modes including a vertical mode, a horizontal mode, a DC (Direct Current) mode, a diagonal down-left mode, a diagonal down-right mode, a vertical-right mode, a horizontal-down mode, a vertical-left mode, and a horizontal-up mode.

In the case of prediction mode number 0, i.e., vertical mode, it is assumed that the 4×4 current block to be encoded is an area having similar pixel values in the vertical direction, and four pixels (A, B, C, D) in a top and adjacent block of the 4×4 current block are used to generate a predicted block having a same pixel value in units of respective vertical columns. In the case of prediction mode 1, i.e., horizontal mode, it is assumed that the 4×4 current block to be encoded is an area having similar pixel values in the horizontal direction, and four pixels (I, J, K, L) in a left and adjacent block of the 4×4 current block are used to generate a predicted block having a same pixel value in each of the rows. In the case of prediction mode 2, i.e., DC mode, it is assumed that the 4×4 current block is a relatively flat area, and an average value of the pixel values of thirteen pixels (A-M) adjacent to the 4×4 current block is used to generate a predicted block, the current block of which has all the sixteen pixels of a same pixel value. The remaining predicted modes assume areas to have similar pixel values in the corresponding prediction directions, and generate predicted blocks in their respective prediction directions. If the pixels needed for prediction are at integer pixel locations, the surrounding pixels of the corresponding integer pixel are subjected to a low pass filter ([¼ 2/4 ¼]) before use, and if they are at half pixel locations, integer pixels are used with an interpolation.

Although not illustrated, the intra_8×8 prediction has the same prediction modes as those of the intra_4×4 prediction, and the intra_16×16 prediction has four different prediction modes including a vertical mode, a horizontal mode, a DC mode, and a plane mode.

Figure 2:
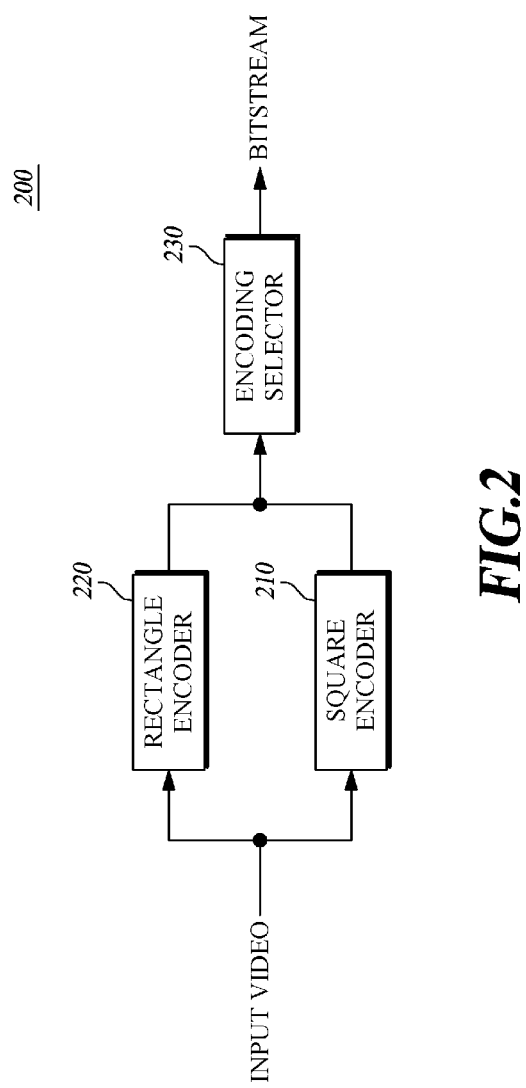
FIG. 2 is a block diagram schematically illustrating the electronic configuration of a video encoding apparatus according to an aspect.

FIG. 2 is a block diagram schematically illustrating the electronic configuration of a video encoding apparatus 200 according to an aspect.

A video encoding apparatus 200 according to an aspect is an apparatus for encoding video, and may be configured to include a square encoding unit or square encoder 210, a rectangular encoding unit or rectangle encoder 220, and an encoding selector 230.

The video encoding apparatus 200 may be a personal computer or PC, notebook or laptop computer, personal digital assistant or PDA, portable multimedia player or PMP, PlayStation Portable or PSP, or mobile communication terminal, smart phone and may mean a variety of apparatuses equipped with, for example, a communication device such as a modem for carrying out communications with various devices or communication networks, a memory for storing various programs for encoding video and related data, and a microprocessor and the like for executing the programs to effect operations and controls thereof.

Upon receiving each of subblocks of a macroblock of the image to be encoded, square encoder 210 outputs a squarely encoded bitstream by encoding the subblocks in units of a square block. That is, as in a typical video encoding, the square encoder 210 predicts the current block by setting each of the subblocks inputted in units of a square block according to a determined block mode, as the current block against each subblock, and generates residual blocks of the current blocks against the respective subblocks to perform transform, quantization, and encoding on the residual blocks and thereby outputs a bitstream. In the present disclosure, the bitstream, which is encoded and outputted by the square block unit, is called a "squarely encoded bitstream".

Receiving the respective subblocks of a macroblock of the image to be encoded, rectangle encoder 220 decomposes and then successively encodes the current block into rectangular block units for outputting a rectangularly encoded bitstream. That is, unlike the typical encoding, the rectangle encoder 220 carries out setting each of the subblocks inputted in units of a square block according to a determined block mode, as the current block against each subblock and making rectangular block segments in the prediction direction of the current block, and then successively predicts the respective rectangular blocks with their residual blocks transformed and quantized and in turn combines them into square blocks which are then scanned and encoded into a bitstream output. In the present disclosure, the bitstream, which is outputted from the successive encoding by the rectangular block unit, is called a "rectangularly encoded bitstream".

The encoding selector 230 uses one or more of the squarely encoded bitstream of each subblock and the rectangularly encoded bitstream of each subblock to generate and output the bitstream of the macroblock, but it generates the same based on a cost for encoding where the bitstream of the macroblock contains at least one rectangularly encoded bitstream and a cost for encoding where the bitstream of the macroblock contains no rectangularly encoded bitstream.

Figure 3:
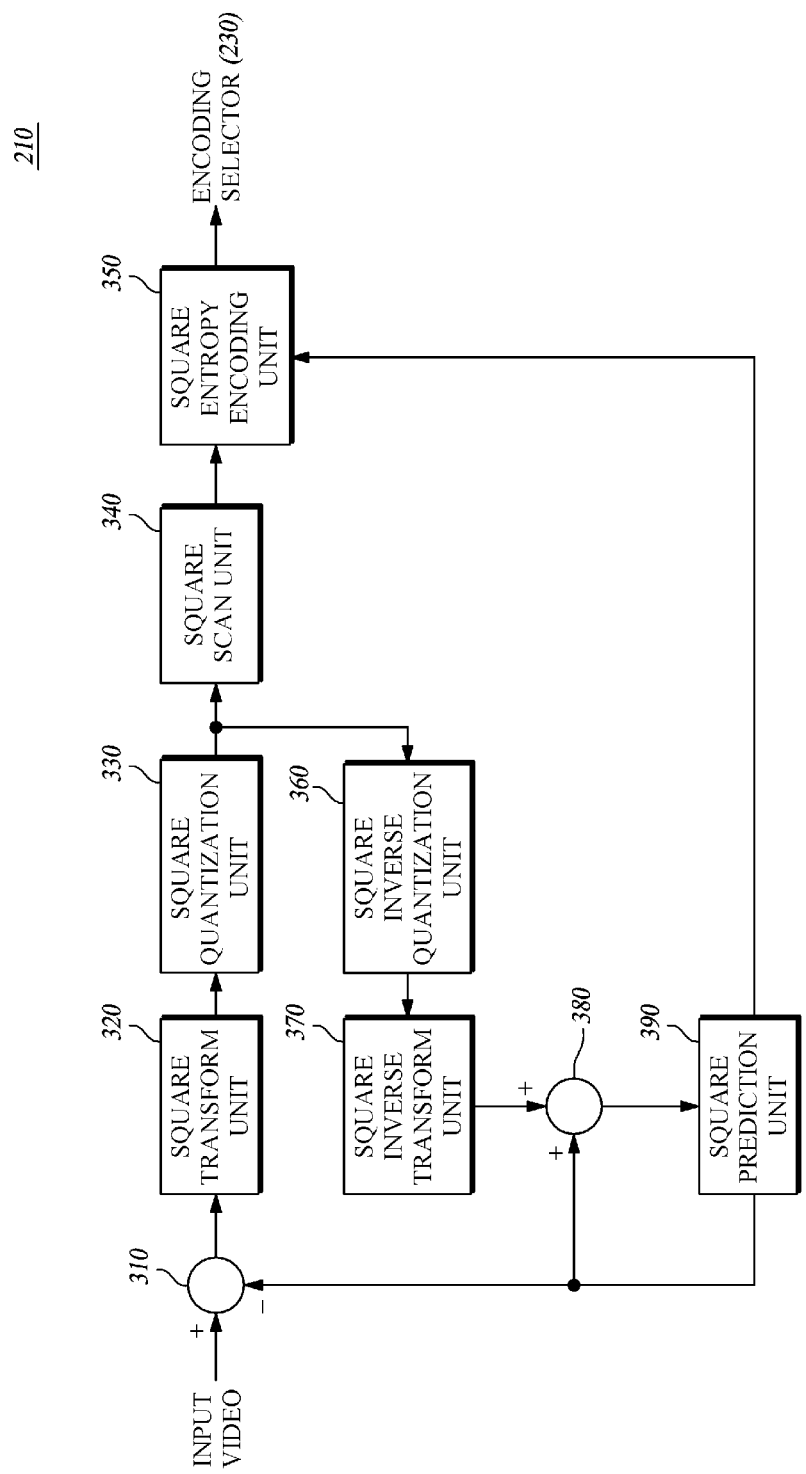
FIG. 3 is a block diagram schematically illustrating the electronic configuration of a square encoding apparatus according to an aspect.

FIG. 3 is a block diagram schematically illustrating the electronic configuration of a square encoding apparatus according to an aspect of the present disclosure.

The square encoding apparatus according to an aspect of the present disclosure may be implemented in FIG. 2 by square encoder 210 and will be called square encoder 210 hereinafter. Square encoder 210 according to an aspect of the present disclosure comprises a square subtraction unit 310, a square transform unit 320, a square quantization unit 330, a square scanning unit 340, a square entropy encoding unit 350, a square inverse quantization unit 360, a square inverse transform unit 370, a square addition unit 380, and a square prediction unit 390.

Square subtraction unit 310 generates a residual block by subtracting the predicted block by square prediction unit 380 from the current block to output a residual block. I.e., subtraction unit 310 subtracts a predicted pixel value of each pixel of the predicted block by square prediction unit 380 from the original pixel value of each pixel of the current block to generate the residual signal between the pixel values as the residual block.

Square transform unit 320 transforms the residual block into a frequency domain to generate the residual block having frequency coefficients. Here, square transform unit 320 may use a DCT (Discrete Cosine Transform) based transform, Hadamard transform, and the like, but is not limited thereto and use diverse transform techniques from improving and modifying the DCT transform for transforming the residual signal into the frequency domain.

Square quantization unit 330 quantizes the residual block transformed by square transform unit 320 to generate the residual block having quantized frequency coefficients. Such quantization method may use a DZUTQ (Dead Zone Uniform Threshold Quantization), quantization weighted matrix, or the like, but also use diverse quantization methods improved from the DZUTQ and the others.

Square scanning unit 340 generates a quantized frequency coefficient string by scanning quantized frequency coefficients of the residual block quantized by square quantization unit 330 using diverse scanning methods such as a zigzag scan.

Square entropy encoding unit 350 encodes the quantized residual blocks into a bitstream. In other words, square entropy encoding unit 350 generates the bitstream by encoding the quantized frequency coefficient string that is scanned and generated by square scanning unit 340. In addition, square entropy encoding unit 350 may encode not only the quantized residual blocks but also information on the prediction mode or prediction direction determined by square prediction unit 390 into the bitstream together with the residual blocks. For such encoding technology, an entropy encoding technique may be used but is not necessarily limited thereto, and various other encoding techniques may be used. In the present disclosure, the bitstream outputted from square entropy encoding unit 350 is called the squarely encoded bitstream.

Square inverse quantization unit 360 generates inverse-quantized residual blocks by performing an inverse quantization on the quantized residual blocks. In other words, square inverse quantization unit 360 generates the residual blocks having the inversely quantized frequency coefficients by inversely quantizing the quantized frequency coefficients of the quantized residual blocks.

Square inverse transform unit 370 generates an inversely transformed residual block by inversely transforming the inverse-quantized residual block. In other words, square inverse transform unit 370 generates the inverse-transformed residual block having the pixel values by inversely transforming the inversely quantized frequency coefficients of the inversely quantized residual block into a time domain.

Square addition unit 380 reconstructs the current block by adding the residual block inversely transformed by the square inverse transform unit 370 to the predicted block by square prediction unit 390, and outputs the reconstructed current block to square prediction unit 390.

Square prediction unit 390 generates the predicted block by predicting the current block. That is, square prediction unit 390 generates the predicted block having the predicted pixel values as the pixel values of the respective pixels by predicting the pixel values of the respective pixels of the current block of the video to be encoded in accordance with the predetermined block mode and prediction mode. In this event of predicting the respective pixel values of the current block, the pixel values of the previous block which is previously reconstructed through encoding and decoding are used, that is, the reconstructed block received from square addition unit 380 before the current block are used.

Figure 4:
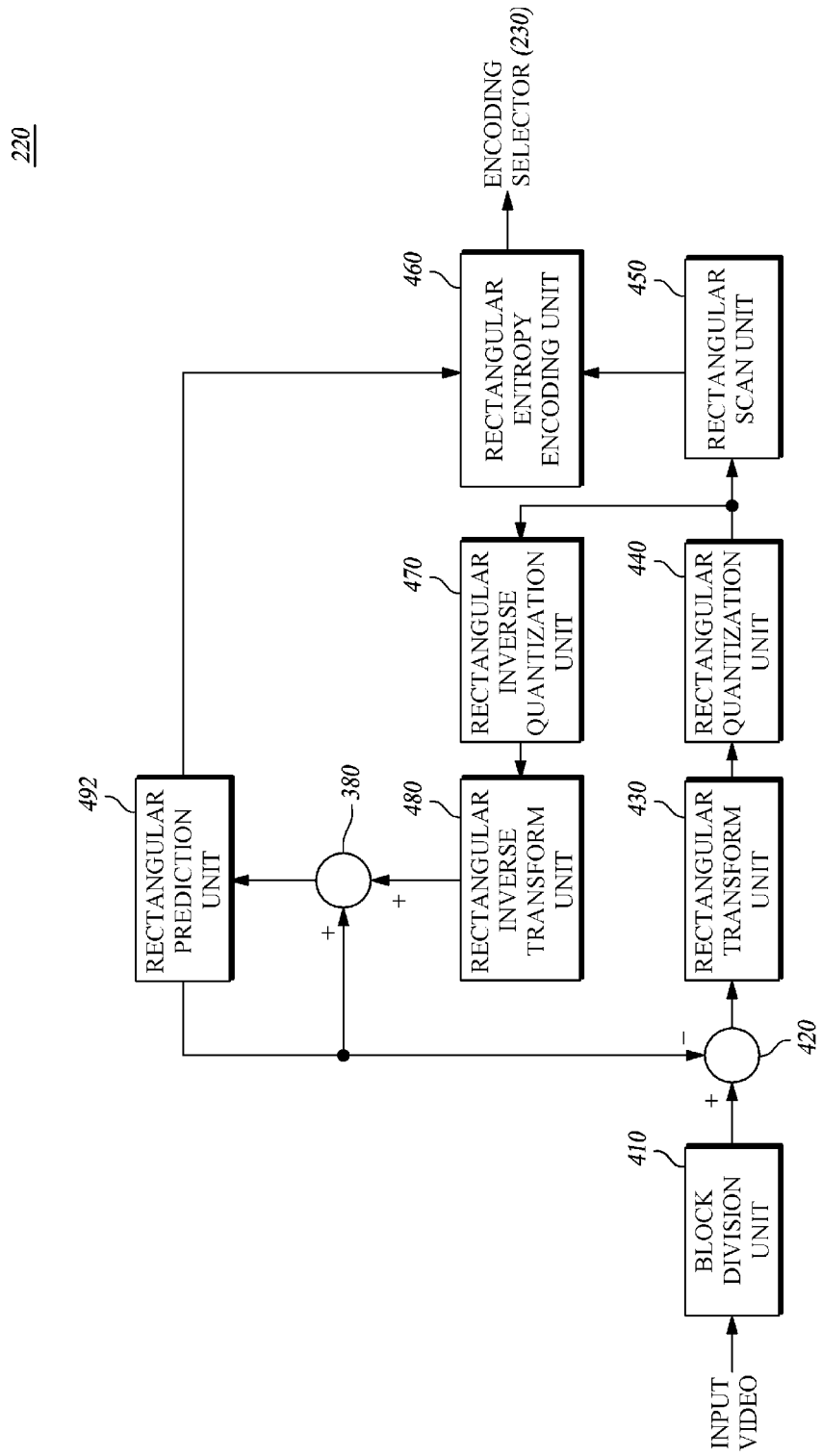
FIG. 4 is a block diagram schematically illustrating the electronic configuration of a rectangular encoding apparatus according to an aspect.

FIG. 4 is a block diagram schematically illustrating the electronic configuration of a rectangular encoding apparatus according to an aspect.

Since the rectangular encoding apparatus according to an aspect of the present disclosure may be implemented in FIG. 2 by rectangle encoder 220, it will be hereinafter called rectangle encoder 220. Rectangle encoder 220 according to an aspect of the present disclosure comprises a block division unit 410, a rectangular subtraction unit 420, a rectangular transform unit 430, a rectangular quantization unit 440, a rectangular scanning unit 450, a rectangular entropy encoding unit 460, a rectangular inverse quantization unit 470, a rectangular inverse transform unit 480, a rectangular addition unit 490, and a rectangular prediction unit 492.

Block division unit 410, upon receiving the current block, decomposes the current block into rectangular block units to output a plurality of rectangular current blocks. Here, the current block is determined as a square block according to the block mode and the encoding mode, and block division unit 410, in an effort to improve the prediction efficiency by predicting the pixels of the current block from a closer one of the neighboring pixels in the intra prediction, decomposes the current block into rectangular blocks, and successively predicts the respective decomposed rectangular current blocks.

Further, in decomposing the square current block into a plurality of rectangular blocks, block division unit 410 may determine the size of the rectangular blocks by the prediction direction according to the prediction mode of the current block. In other words, the rectangular current block divided by block division unit 410 may be number N of N×1 block, N/2 of N×2 block, N of 1×N block, N/2 of 2×N block, and the like.

Figure 9:
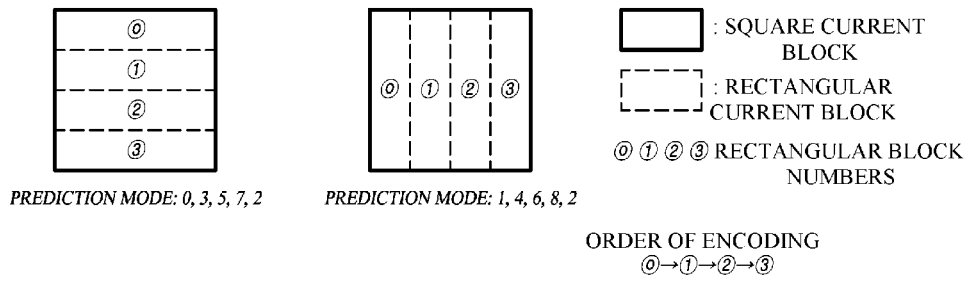
FIG. 9 is a diagram illustrating the divisional shapes of a rectangular block and the sequence of encoding by prediction mode according to an aspect.

Referring to FIG. 9 that illustrates the divisional shapes of a rectangular block and the sequence of encoding by prediction mode according to an aspect, block division unit 410 may decompose the square current block into the illustrated rectangular blocks which may be encoded respectively in the sequence illustrated.

For example, assuming that the block mode of the current block is 4×4 block, the 4×4 current block may be decomposed into four 4×1 rectangular current blocks in the cases of the near vertical prediction directions which are mode 0 (vertical), mode 5 (vertical right), and mode 7 (vertical left), and the 4×4 current block may be decomposed into four 1×4 sub-blocks in the cases of the near horizontal prediction directions which are mode 1 (horizontal), mode 6 (horizontal down), and mode 8 (horizontal up). In the case of mode 2 (DC), the 4×4 current block may be adaptably decomposed into 4×1 rectangular current blocks or 1×4 rectangular current blocks depending on peripheral data (i.e. the adjacent pixels in the neighboring block), and in the cases of the diagonally related mode 3 (diagonal down left) and mode 4 (diagonal down right), the 4×4 current block may be decomposed into both of four 4×1 rectangular current blocks and four 1×4 rectangular current blocks.

Here, in the case of mode 2, the peripheral data used in decomposing the 4×4 square current block may be a vertical band correlation and a horizontal band correlation as illustrated. Specifically, if the vertical band correlation is smaller than the horizontal band correlation, the 4×4 square current block may be decomposed into the 4×1 rectangular current blocks, and if the vertical band correlation is greater than or equal to the horizontal band correlation, the 4×4 square current block may be decomposed into the 1×4 rectangular current blocks. The vertical band correlation and the horizontal band correlation may be calculated by the equations as illustrated.

Additionally, the encoding sequence of the rectangular current blocks in modes 0, 3, 5, and 7 may be so that the 4×4 square current block is encoded at its first row to the fourth row in this order. Additionally, in the cases of modes 1, 4, 6, and 8, the encoding sequence of the rectangular current blocks may start with encoding its first column followed by the second, third, and then fourth columns of the 4×4 square current block.

Referring back to FIG. 4, rectangular subtraction unit 420 generates a plurality of rectangular residual blocks by subtracting a plurality of rectangular predicted blocks by rectangular prediction unit 492 from a plurality of rectangular current blocks decomposed by block division unit 410.

Rectangular transform unit 430 transforms the plurality of rectangular residual blocks generated by subtraction unit 420 into a frequency domain. That is, rectangular transform unit 430 transforms the respective pixel values of the rectangular residual blocks into the frequency domain by using a DCT based transform or the like to generate the residual blocks having the frequency coefficients. At this time, transforming the respective pixel values of the residual blocks of a rectangular form into the frequencies may be performed through a matrix transform or the like.

Rectangular quantization unit 440 quantizes a plurality of rectangular residual blocks transformed by rectangular transform unit 430. In other words, rectangular quantization unit 440 quantizes the frequency coefficients of the plurality of rectangular residual blocks to generate the residual blocks having the quantized frequency coefficients.

Rectangular scanning unit 450 combines the plurality of residual blocks quantized by rectangular quantization unit 440 to generate quantized rectangular residual blocks, and scans the quantized frequency coefficients to generate a quantized frequency coefficient string. In other words, rectangular scanning unit 450 combines the plurality of respectively quantized residual blocks according to the block mode of the current block and the prediction direction of the prediction mode to generate the residual blocks of a square form, and scans the respectively quantized frequency coefficients of the square form of residual blocks by a certain scanning method to generate the quantized frequency coefficient string.

Rectangular encoding unit 460 encodes the quantized frequency coefficient string generated by rectangular scanning unit 450 to generate a bitstream. That is, rectangular encoding unit 460 generates the bitstream by encoding the quantized frequency coefficient string using a variety of encoding methods such as entropy encoding and the like. At this time, rectangular entropy encoding unit 460 may additionally encode the prediction mode of the current block.

The following description addresses how current blocks of the input video are encoded by the rectangular encoding apparatus as described above with reference to FIG. 4. When the current block is received, the rectangular encoding apparatus decomposes the current block by the unit of rectangular block to output a plurality of rectangular current blocks, successively predicts the plurality of rectangular current blocks to output a plurality of rectangular predicted blocks, subtracts the plurality of rectangular predicted blocks from the plurality of rectangular current blocks to generate a plurality of rectangular residual blocks, transforms the plurality of rectangular residual blocks into a frequency domain, quantizes the plurality of transformed rectangular residual blocks, combines the plurality of quantized rectangular residual blocks to generate a quantized square residual block and scan their quantized frequency coefficients for generating a quantized frequency coefficient string, and then encodes the quantized frequency coefficient string to generate a bitstream.

Figure 5:
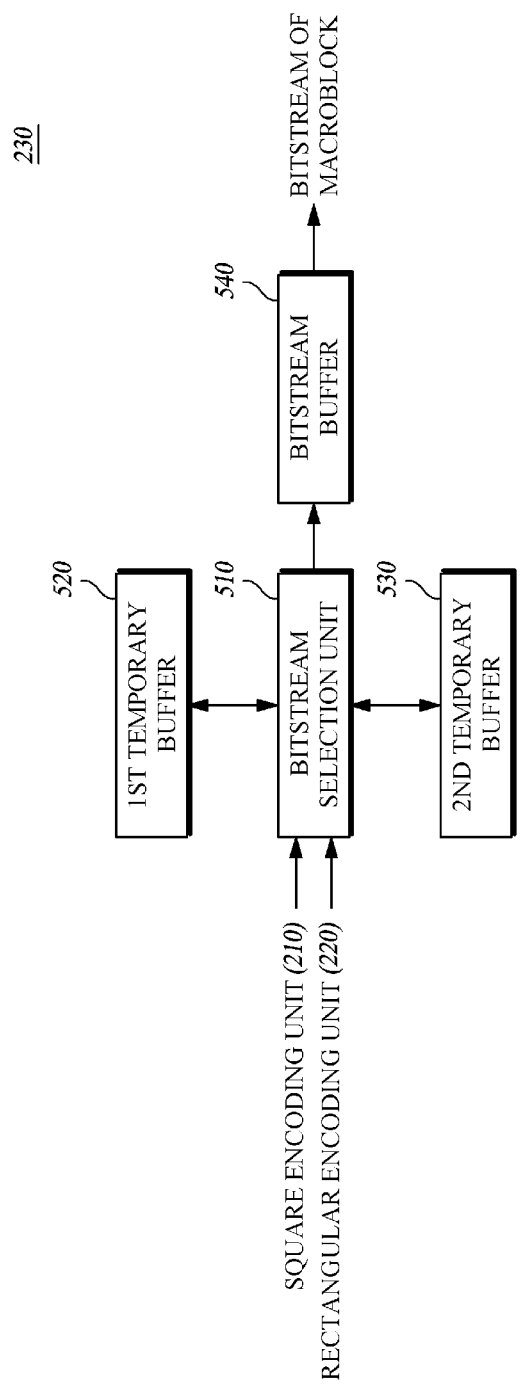
FIG. 5 is a block diagram schematically illustrating the electronic configuration of an encoding selection apparatus according to an aspect.

FIG. 5 is a block diagram schematically illustrating the electronic configuration of an encoding selection apparatus according to an aspect.

Since the encoding selection apparatus according to an aspect of the present disclosure may be implemented by encoding selector 230 in the illustration of FIG. 2, it will be hereinafter called encoding selector 230. Encoding selector 230 according to an aspect may comprise a bitstream selection unit 510, a first temporary buffer 520, a second temporary buffer 530, and a bitstream buffer 540.

When a rectangularly encoded bitstream of each subblock of a macroblock from the rectangle encoder 220 and a squarely encoded bitstream of each subblock of a macroblock from square encoder 210 are both received, bitstream selection unit 510 stores the squarely encoded bitstream of each subblock in first temporary buffer 520, and makes a selection by the respective subblocks between the squarely encoded bitstream of each subblock and the rectangularly encoded bitstream of each subblock to store the selection in second temporary buffer 530.

For this purpose, bitstream selection unit 510 may initialize first temporary buffer 520 and second temporary buffer 530 at every encoding of a new macroblock of an image, store the squarely encoded bitstream received from square entropy encoding unit 350 in first temporary buffer 520 for every subblock in the macroblock, and calculate the cost of square encoding by the respective subblocks. In addition, prior to storing the rectangularly encoded bitstream received from rectangular entropy encoding unit 460, bitstream selection unit 510 may calculate the cost of rectangular encoding by the respective subblocks and compare the cost of square encoding against that of rectangular encoding by the respective subblocks to see if the costs of square encoding is lower and any one of the quantized frequency coefficients of the squarely encoded bitstream is not 0 and then store the squarely encoded bitstream in second temporary buffer 530, and otherwise store the rectangularly encoded bitstream in second temporary buffer 530.

Here, the cost of square encoding refers to the cost of encoding the squarely encoded bitstream and it may be calculated by the rate-distortion (RD) cost, although other unlimited calculation methods may be used to calculate the cost for encoding operations. In addition, the cost of rectangular encoding refers to the cost of encoding the rectangularly encoded bitstream and it may be calculated in the same method as calculating the cost of square encoding. In the following description, the cost of square encoding will be conveniently called 'RDcost1' and the cost of rectangular encoding will be conveniently called 'RDcost2'.

In addition, if RDcost1 is less than RDcost2 and all of the quantized frequency coefficients of the squarely encoded bitstream are 0, bitstream selection unit 510 may store the rectangularly encoded bitstream in second temporary buffer 530, and again if all of the quantized frequency coefficients of the rectangularly encoded bitstream are 0, bitstream selection unit 510 may not insert a block mode bit into second temporary buffer 530 but it may generate and store the block mode bit for representing the rectangular encoding in second temporary buffer 530 if at least one of the quantized frequency coefficients of the rectangularly encoded bitstream is not 0.

In addition, if RDcost1 is less than RDcost2 and at least one of the quantized frequency coefficients of the squarely encoded bitstream is not 0, bitstream selection unit 510 may store the squarely encoded bitstream in second temporary buffer 530 and store the block mode bit for representing the square encoding in second temporary buffer 530.

Here, the block mode bit means the bit for discernibly representing whether the bitstream stored in units of a subblock in second temporary buffer 530 was the squarely encoded bitstream generated through the square encoding or the rectangularly encoded bitstream generated through the rectangular encoding. The block mode bit may be generated in 1 bit, and for example the block mode bit of '0' may represent the squarely encoded bitstream, and the block mode bit of '1' may represent the rectangularly encoded bitstream.

In addition, bitstream selection unit 510 may store the squarely encoded bitstream by the respective subblocks within the macroblock in first temporary buffer 520, and store the block mode bit for representing one between the squarely encoded bitstream and the rectangularly encoded bitstream and its encoding scheme or method of encoding in second temporary buffer 530 selectively according to the quantized frequency coefficients until these operations are completed against the entire subblocks, and then calculate the encoding costs of first temporary buffer 520 and second temporary buffer 530 to see if first temporary buffer 520 has lower encoding cost and then store bitstreams that have been stored in first temporary buffer 520 in bitstream buffer 540 as the bitstream of the macroblock and generate a macroblock mode bit and store it in bitstream buffer 540 for representing absence of the rectangularly encoded bitstream in the bitstream of the macroblock. In addition, bitstream selection unit 510, in response to the encoding cost of first temporary buffer 520 being equal to or higher than encoding cost of second temporary buffer 530, may store bitstreams that have been stored in second temporary buffer 530 in bitstream buffer 540 as the bitstream of the macroblock and generate a macroblock mode bit and store it in bitstream buffer 540 for representing inclusion of at least one rectangularly encoded bitstream in the bitstream of the macroblock.

Here, the encoding costs of the first temporary buffer refers to the cost of encoding the bitstreams stored in first temporary buffer 520 and the encoding costs of the second temporary buffer refers to the cost of encoding the bitstreams stored in second temporary buffer 530 and the encoding costs may be the rate-distortion (RD) costs such as RDcost1 and RDcost2. In the following description, the encoding cost of the first temporary buffer will be conveniently called 'RDcostmb1' and the encoding cost of the second temporary buffer will be conveniently called 'RDcostmb2'.

In addition, the macroblock mode bit means the bit for discernibly representing whether the bitstream of the macroblock is one that is in accordance with just the square encoding or that contains a bitstream from using the rectangular encoding. The macroblock mode bit may be generated in 1 bit, and for example the macroblock mode bit assigned '0' may represent that the bitstream of the macroblock is in accordance with just the square encoding, and the macroblock mode bit assigned '1' may represent that the bitstream of the macroblock contains a bitstream from using the rectangular encoding.

First temporary buffer 520 and second temporary buffer 530 mean memory devices such as buffers or memories which store information or data. First temporary buffer 520 is a buffer for exclusively storing the squarely encoded bitstreams of the entire subblocks in the macroblock and second temporary buffer 530 is a buffer for selectively storing one between the rectangularly encoded bitstreams and the squarely encoded bitstreams.

Bitstream buffer 540 is for storing the bitstreams which are in store by either first temporary buffer 520 or second temporary buffer 530 as is decisively selected by bitstream selection unit 510. The stored bitstream in bitstream buffer 540 becomes the encoding result of the corresponding macroblock which is to be the bitstream transmitted or delivered to an image decoding apparatus.

Figure 6:
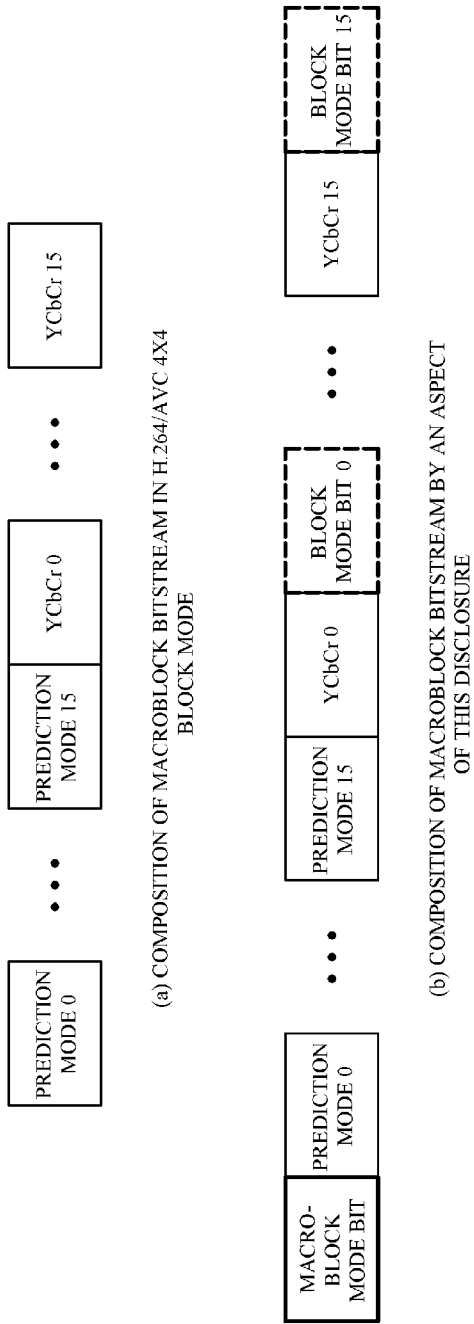
FIG. 6 is a diagram of the composition of a bitstream according to an aspect.

FIG. 6 is a diagram of the composition of a bitstream according to an aspect.

Illustrated at FIG. 6(a) is the composition of a bitstream of a macroblock in H.264/AVC 4×4 block mode, and at FIG. 6(b) is the composition of a bitstream of a macroblock in accordance with an aspect of the present disclosure.

Prediction modes 0 through 15 as shown at FIG. 6(a) represent prediction mode bits and are information encoded respectively of the prediction modes of sixteen 4×4 subblocks in a macroblock, and YCbCr 0 through YCbCr 15 represent coefficient bits of the respective subblocks and are those entropy encoded of quantized frequency coefficients of luminance components (Y) and chrominance components (Cb, Cr) in the respective 4×4 subblocks. In order to use the squarely encoded bitstreams and the rectangularly encoded bitstreams adaptively, macroblock mode bits may be added in units of a macroblock to the bitstream and block mode bits may be added in units of a subblock to the bitstream. The macroblock mode bit represents whether at least one rectangularly encoded bitstream is present in the corresponding macroblock and it may be composed of 1 bit.

If the macroblock mode bit helps to determine the rectangularly encoded bitstream is used, it may be indicated through the macroblock mode bit whether the sixteen 4×4 subblocks respectively used the rectangularly encoded bitstream. The macroblock mode bit may be at the forefront of the bitstream of the macroblock, whereby the image decoding apparatus is allowed to determine whether at least one of the subblocks of the corresponding macroblock was encoded in the rectangular encoding scheme.

The block mode bit is inserted in the bitstream only if one or more non-zero quantized frequency coefficients are present in the bitstream of the corresponding subblock, but it is not inserted if the quantized frequency coefficients are all 0. The block mode bit may be inserted behind the coefficient bits of the corresponding block so that the coefficient bits of the respective subblocks is first confirmed before determining the presence or absence of the block mode bit. On the other hand, the squarely encoded bitstreams are encoded to avoid the case where quantized coefficients become entirely zero.

Figure 7:
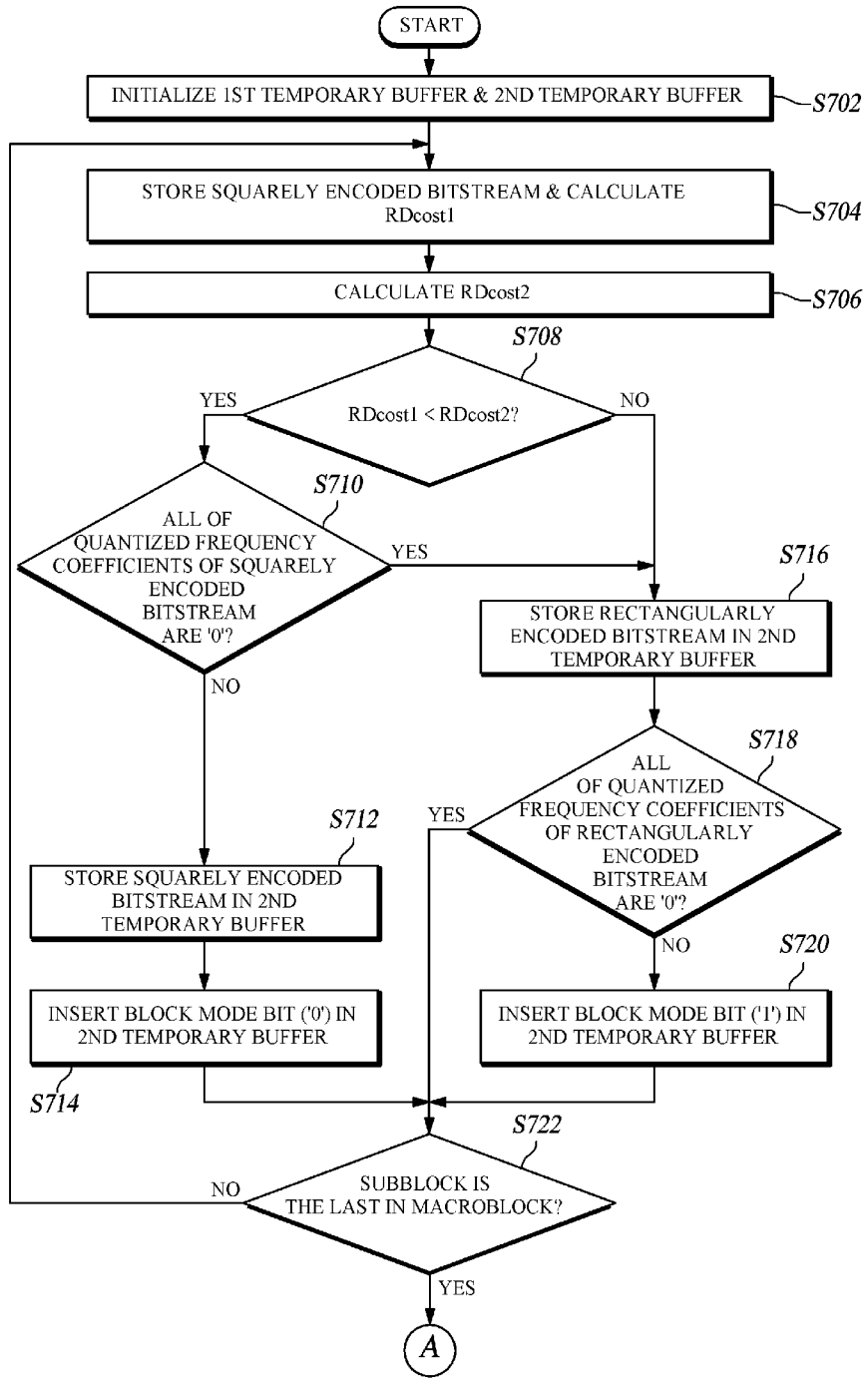
FIGS. 7 and 8 are a flowchart illustrating an encoding selection process for composing the bitstream of a macroblock according to an aspect.
Figure 8:
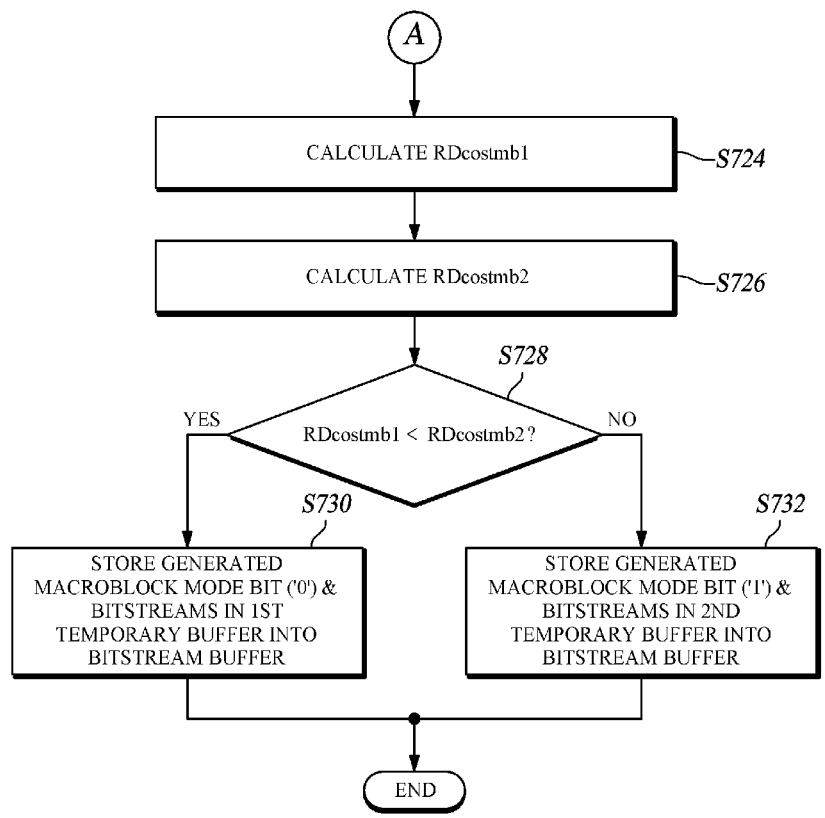

FIGS. 7 and 8 are a flowchart illustrating an encoding selection process for composing the bitstream of a macroblock according to an aspect.

Upon receiving respective subblocks of a macroblock inputted, image encoding apparatus 200 decomposes them in units of a rectangular block followed by a stepwise encoding to output a rectangularly encoded bitstream for each subblock and encoding the respective subblocks of the inputted macroblock in units of a square block to output a squarely encoded bitstream for each subblock, calculates the encoding cost when the bitstream of the macroblock includes at least one rectangularly encoded bitstream and the encoding cost when the bitstream of the macroblock does not include a rectangularly encoded bitstream, use the encoding costs for the two occasions as a basis for incorporating at least one of the rectangularly encoded bitstream for each subblock and the squarely encoded bitstream for each subblock in generating and outputting bitstreams of the macroblocks.

To this end, bitstream selection unit 510 in encoding selector 230 of image encoding apparatus 200 initializes first temporary buffer 520 and second temporary buffer 530 (step S702), stores the squarely encoded bitstream delivered from square encoder 210 in first temporary buffer 520 and calculates the cost (RDcost1) for square encoding (step S704), and calculates the cost (RDcost2) for rectangular encoding (step S706).

Bitstream selection unit 510 compares between RDcost1 and RDcost2 to determine if RDcost1 is smaller than RDcost2 (step S708), and if yes, determines whether all of the quantized frequency coefficients of the squarely encoded bitstream are '0' (step S710) or, if at least one of the quantized frequency coefficients of the squarely encoded bitstream are not '0', then stores the squarely encoded bitstream delivered from square encoder 210 in second temporary buffer 530 (step S712), and inserts a block mode bit (for example, '0') in second temporary buffer 530 (step S714).

In addition, bitstream selection unit 510, after determining in step S708 that RDcost1 is greater than or equal to RDcost2 or that RDcost1 is smaller than RDcost2 but all of the quantized frequency coefficients of the squarely encoded bitstream are '0', stores the rectangularly encoded bitstream in second temporary buffer 530 (step S716), determines if all of the quantized frequency coefficients of the rectangularly encoded bitstream are '0' (step S718), and if yes, refrains from inserting a block mode bit in second temporary buffer 530 or, if at least one of the quantized frequency coefficients of the rectangularly encoded bitstream are not '0', then generates a block mode bit (for example, '1') for representing the rectangular encoding to insert it in second temporary buffer 530 (step S720).

In steps S714 and S720, the insertion of the block mode bit in second temporary buffer 530 is to identify the manner of encoding the bitstream which was stored in second temporary buffer 530. In other words, first temporary buffer 520 needs to have no block mode bit inserted since it exclusively stores the squarely encoded bitstream, whereas the block mode bit is inserted in second temporary buffer 530 so as to identify the bitstream it stores as being either the squarely encoded bitstream or rectangularly encoded bitstream since second temporary buffer 530 selectively stores the squarely encoded bitstream or rectangularly encoded bitstream by respectively corresponding subblocks.

However, if all of the quantized frequency coefficients of the corresponding bitstream are '0', the block mode bit is stopped from being stored in second temporary buffer 530 regardless of whether the bitstream stored in second temporary buffer 530 is either squarely encoded bitstream or rectangularly encoded bitstream. In other words, this is from the arrangement that a squarely encoded bitstream with entirely '0' quantized frequency coefficients makes second temporary buffer 530 store a rectangularly encoded bitstream, and if the same rectangularly encoded bitstream has entirely '0' quantized frequency coefficients, a block mode bit is not stored in second temporary buffer 530. This is because the entirely '0' quantized frequency coefficients of a bitstream may identify the same as the rectangularly encoded bitstream requiring no block mode bit to inquire.

In this process, bitstream selection unit 510 selectively stores the bitstreams of the subblocks delivered from square encoder 210 and rectangle encoder 220 in first temporary buffer 520 or second temporary buffer 530.

Thereafter, bitstream selection unit 510 determines whether the current block that underwent steps S704 through S720 is the last subblock (S722), and if not, repeats steps S704 through S720 for selectively storing the bitstreams of the next subblocks delivered from square encoder 210 and rectangle encoder 220 in first temporary buffer 520 or second temporary buffer 530.

If step S722 determines that the current block is the last subblock, bitstream selection unit 510 calculates the encoding cost RDcostmb1 of the first temporary buffer (step S724) and calculates the encoding cost RDcostmb2 of the second temporary buffer (step S726). Then, bitstream selection unit 510 determines by comparison if RDcostmb1 is smaller than RDcostmb2 (step S728), and if yes, generates a macroblock mode bit for representing non-inclusion of the rectangularly encoded bitstream in the bitstreams of the macroblock (i.e., macroblock mode bit of such as '0' for representing that the bitstreams of the macroblock have no rectangularly encoded bitstream but is consisted of squarely encoded bitstreams) and stores the generated macroblock mode bit and bitstreams stored in first temporary buffer 520 into bitstream buffer 540 (step S730), while if RDcostmb1 is greater than or equal to RDcostmb2, it generates a macroblock mode bit for representing inclusion of at least one rectangularly encoded bitstream in the bitstreams of the macroblock (i.e., macroblock mode bit of such as '1' for representing that the bitstreams of the macroblock comprise selections of squarely encoded bitstreams and rectangularly encoded bitstreams) and stores the generated macroblock mode bit and bitstreams stored in first temporary buffer 520 into bitstream buffer 540 (step S732). The stored bitstreams in bitstream buffer 540 are transmitted or delivered as the final bitstreams of the corresponding macroblock to video decoding apparatuses.

Figure 10:
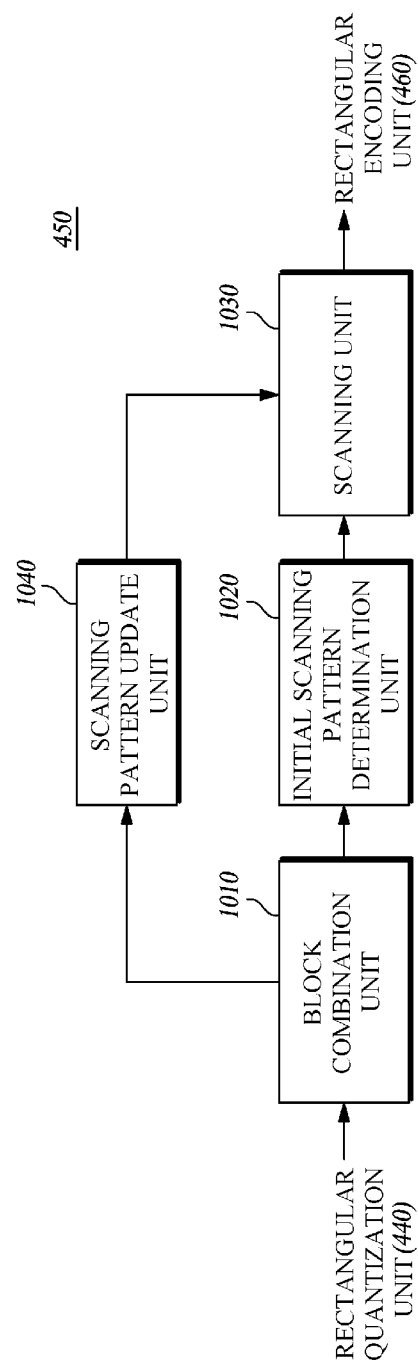
FIG. 10 is a block diagram schematically illustrating the electronic configuration of a rectangular scanning apparatus according to an aspect.

FIG. 10 is a block diagram schematically illustrating the electronic configuration of a rectangular scanning apparatus according to an aspect of the present disclosure.

The rectangular scanning apparatus according to an aspect of the present disclosure may be implemented by rectangular scanning unit 450 in FIG. 4. Hereinafter, the rectangular scanning apparatus according to an aspect of the present disclosure will be called rectangular scanning unit 450.

The rectangular scanning unit 450 according to an aspect of the present disclosure may comprise a block combination unit 1010, an initial scanning pattern determination unit 1020, a scanning unit 1030, and a scanning pattern update unit 1040.

Block combination unit 1010 generates quantized square residual blocks in the form of a square by combining a plurality of quantized rectangular residual blocks delivered from rectangular quantization unit 440 in accordance with the prediction direction according to the prediction mode of the current block. For example, block combination unit 1010 can generate the residual block in the form of a square by combining the plurality of quantized residual blocks to match the block size according to the corresponding block mode and according to the prediction direction of the prediction mode. That is, if the plurality of quantized residual blocks are four 4×1 blocks, block combination unit 1010 can generate the quantized residual block of a block size 4×4 by combining the four 4×1 blocks in turn in the vertical direction that is the prediction direction.

Initial scanning pattern determination unit 1020 determines the initial scanning pattern to scan the quantized frequency coefficients of the quantized square residual blocks combined by the block combination unit 1010. At this time, initial scanning pattern determination unit 1020 determines the initial scanning pattern according to the size of the video. For example, if the size of the video is equal to or larger than a preset size, initial scanning pattern determination unit 1020 may determine the initial scanning pattern by assigning priorities to the coefficients of the DC component among the quantized frequency coefficients of the square residual block and the lowermost coefficients of the square residual block, and further by assigning a higher priority to the coefficients of the DC component. Also, if the size of the video is smaller than the preset size, initial scanning pattern determination unit 1020 may determine the initial scanning pattern by assigning an equal priority to the coefficients of the DC component among the quantized frequency coefficients of the square residual block and the lowermost coefficients of the square residual block.

Scanning unit 1030 generates a quantized frequency coefficient string by scanning the quantized frequency coefficients of the quantized residual block according to the determined scanning pattern (the initial scanning pattern determined by initial scanning pattern determination unit 1020 or the updated scanning pattern determined by scanning pattern update unit 1040).

Scanning pattern update unit 1040 may adaptively update the scanning pattern according to the probability of the occurrence of non-zero quantized frequency coefficients at respective positions of the square residual block. For example, scanning pattern update unit 1040 may adaptively update the scanning pattern by calculating the probability of the occurrence of non-zero quantized frequency coefficients at the respective positions of the square residual block whenever video encoding apparatus 200 encodes the current block, and determining the scanning order in the order of high probabilities.

Figure 11:
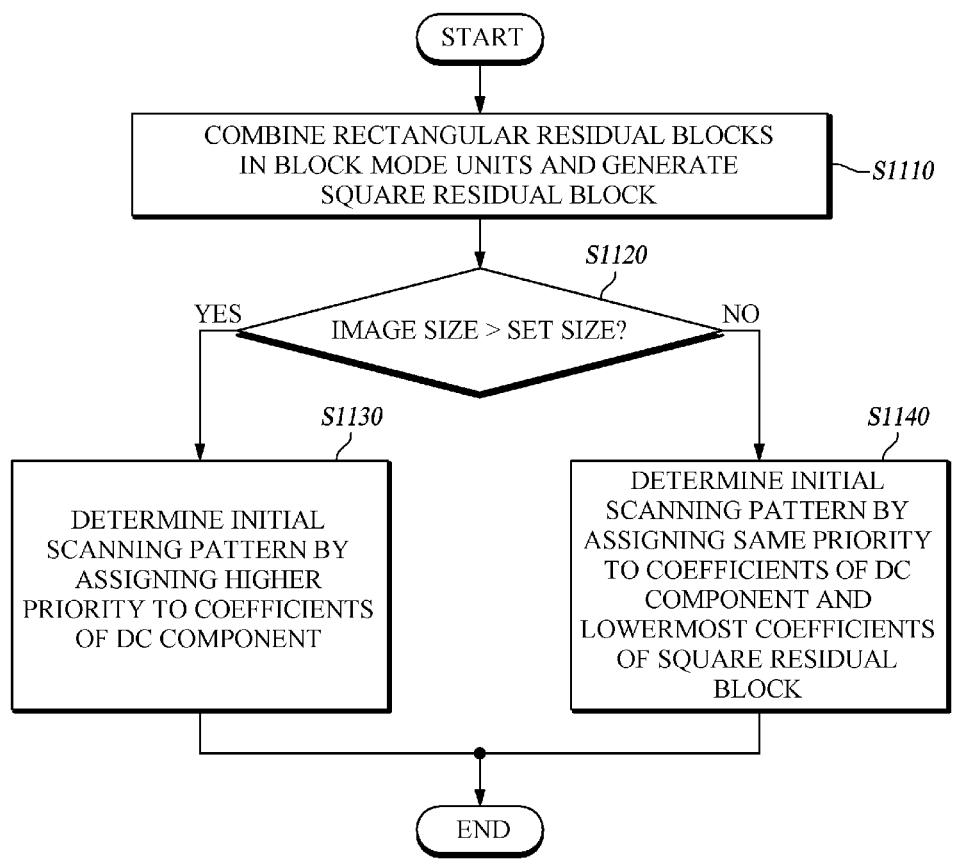
FIG. 11 is a flowchart illustrating a method of determining an initial scanning pattern according to an aspect.

FIG. 11 is a flowchart illustrating a method of determining an initial scanning pattern according to an aspect of the present disclosure.

Rectangular scanning unit 450 generates the square residual block by combining the plurality of quantized rectangular residual blocks in a block mode unit (step S1110), and decides if the size of the video to which the current block belongs is larger than the preset size (step S1120), and if yes, determines the initial scanning pattern by assigning priorities to the coefficients of the DC component among the quantized frequency coefficients of the square residual block and the lowermost coefficients of the square residual block, and further by assigning a higher priority to the coefficients of the DC component (step S1130), but if the size of the video is smaller than the preset size, determines the initial scanning pattern by assigning an equal priority to the coefficients of the DC component among the quantized frequency coefficients of the square residual block and the lowermost coefficients of the square residual block (step S1140).

FIG. 12 is an exemplary diagram illustrating a plurality of rectangular residual blocks combined into a square residual block according to a preferred aspect of the present disclosure.

In FIG. 12 where the prediction mode of the current block is a vertical mode for example, quantized frequency coefficients of a square residual block are shown generated by combining a plurality of rectangular residual blocks in units of 4×4 block mode or 8×8 block mode.

The square residual block combined in the 4×4 block mode is obtained through combining the rectangular residual blocks of 4×1 size in the vertical direction, and the square residual block combined in the 8×8 block mode is obtained through combining the rectangular residual blocks of 8×1 size in the vertical direction.

Since the current block is divided into a plurality of rectangular current blocks and residual blocks of the respective rectangular current blocks are transformed and quantized, the quantized frequency coefficients of the DC component are positioned on the left hand side of the respective quantized rectangular residual blocks. Accordingly, the coefficients of the DC component are concentrated into the left hand side of the quantized square residual blocks combined in units of a square block.

Figure 13:
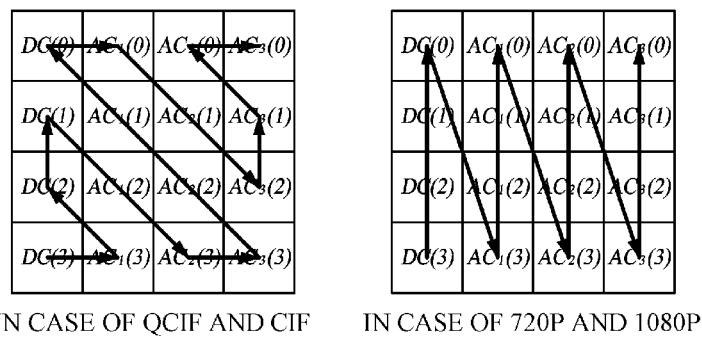
FIG. 13 is a diagram illustrating a process of determining an initial scanning pattern according to an aspect.

FIG. 13 is an exemplary diagram illustrating a process of determining an initial scanning pattern according to an aspect of the present disclosure.

Typically, in the square-shaped square residual blocks, non-zero values occur frequently in the coefficients of the DC component and in the coefficients at the lowermost portion of the residual block. Accordingly, by preferentially scanning the coefficients of the DC component and the lowermost portion which have a high probability that the non-zero values occur, the encoding efficiency can be improved.

On the other hand, the probability that the non-zero values occur in the quantized frequency coefficients of the square residual block varies according to the size of an image. If the size of the image becomes larger, the probability that the non-zero values occur in the coefficients of the DC component becomes higher than the probability that the non-zero values occur in the coefficients in the lowermost portion. Accordingly, in the present disclosure, the initial scanning pattern is determined according to the size of the image.

For example, a threshold of image size may be preset, and if the size of an image is equal to or larger than the preset size, the initial scanning pattern may be determined by assigning priorities to the coefficients of the DC component among the quantized frequency coefficients of the square residual block and the lowermost coefficients of the square residual block, and further by assigning a higher priority to the coefficients of the DC component. Also, if the size of the image is smaller than the preset size, the initial scanning pattern may be determined by assigning an equal priority to the coefficients of the DC component among the quantized frequency coefficients of the square residual block and the lowermost coefficients of the square residual block.

FIG. 13 illustrates the initial scanning pattern that is determined when the preset size is set to 720p for example. If the image is sized QCIF or CIF, it is determined that the image is smaller than the preset size, and the initial scanning pattern may be determined by assigning an equal priority to the coefficients of the DC component and the lowermost coefficients of the square residual block. In this case, the initial scanning pattern is determined to be in the order of $AC_1(3)$, $DC(2)$, $DC(1)$, $AC_1(2)$, $AC_1(3)$, . . . , $AC_3(0)$, starting from $DC(3)$, as indicated by arrows.

In addition, if the size of the image is 720p or 1080p, it is determined that the image is equal to or larger than the preset size, and the initial scanning pattern may be determined by assigning a higher priority to the coefficients of the DC component. In this case, the initial scanning pattern is determined to be in the order of $DC(3)$, $DC(2)$, $DC(0)$, $AC_1(3)$, $AC_1(2)$, . . . , $AC_3(0)$, as indicated by arrows.

Figure 14:
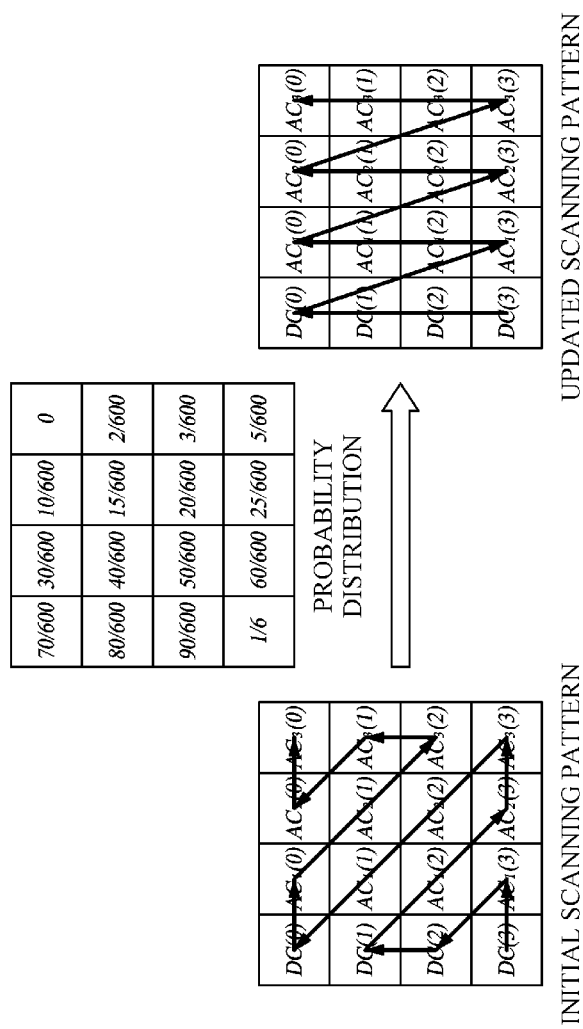
FIG. 14 is a diagram illustrating a process of updating a scanning pattern according to an aspect.

FIG. 14 is an exemplary diagram illustrating a process of updating a scanning pattern according to an aspect of the present disclosure.

As described above with reference to FIG. 13, when the initial scanning pattern is determined, the rectangular scanning unit 450 generates a quantized frequency coefficient string by scanning the quantized frequency coefficients of the quantized square residual block according to the initial scanning pattern, and a rectangular encoded bitstream is generated by encoding the quantized frequency coefficient string in rectangular entropy encoding unit 460. Thereafter, if the next block is inputted subsequent to the current block, the input block is again decomposed into a plurality of rectangular next blocks, their residual blocks are transformed and quantized, and the square residual blocks are combined into a square residual block for a subsequent scanning. Whenever this process is repeated, the scanning is performed by not using the initial scanning pattern initially determined but adaptively updating the scanning pattern.

At this time, the criteria used in adaptively updating the scanning pattern may be the probability of the occurrence of non-zero quantized frequency coefficients according to each position of the square residual block. For example, the scanning pattern can be adaptively updated by calculating the probability of the occurrence of non-zero quantized frequency coefficients whenever the plurality of blocks of the image are encoded and determining the sequence of scanning in descending order of that probability.

As shown in FIG. 14, when the initial scanning pattern is determined for scanning the corresponding square residual block to complete the encoding, the next blocks are encoded in repeated processes while calculating the probability of the occurrence of non-zero quantized frequency coefficients at every position of the quantized frequency coefficient is calculated whenever the encoding is performed at least once. For example, as illustrated, the probability of the occurrence of non-zero quantized frequency coefficients at different positions may be calculated, and in this case, the updated scanning pattern may be determined by determining the scanning pattern in descending order of that probability.

As described above, the images encoded into a bitstream by the video encoding apparatus 200 are transmitted in real time or in non-real time to the video decoding apparatuses to be described later through a communication network, such as the Internet, local area wireless communication network, wireless LAN network, WiBro (Wireless Broadband) also known as WiMax network, mobile communication network, and the like, or cable, a communication interface such as a USB (Universal Serial Bus), and the like. The video transmitted to the video decoding apparatuses may then be decoded for reconstruction into a reproduced video.

Figure 15:
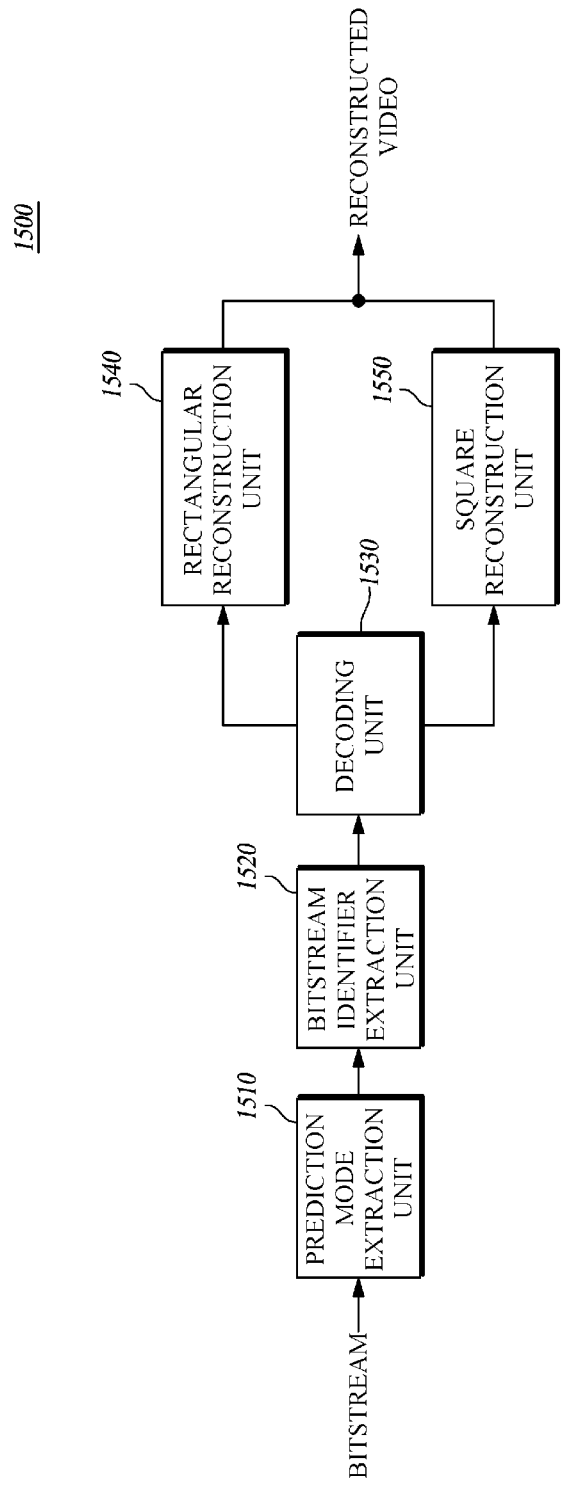
FIG. 15 is a block diagram schematically illustrating the electronic configuration of a video decoding apparatus according to an aspect.

FIG. 15 is a block diagram schematically illustrating the electronic configuration of a video decoding apparatus 1500 according to an aspect of the present disclosure.

Video decoding apparatus 1500 according to an aspect may comprise a prediction mode extraction unit 1510, a bitstream identifier extraction unit 1520, a decoding unit 1530, a rectangular reconstruction unit 1540, and a square reconstruction unit 1550.

Video decoding apparatus 1500 may be a PC (Personal Computer), notebook or laptop computer, personal assistant or PDA, portable multimedia player or PMP, PlayStation Portable or PSP, or mobile communication terminal, smart phone or such devices, and represent a variety of apparatuses equipped with, for example, a communication device such as a modem for carrying out communications between various devices or communication networks, a memory for storing various programs for decoding videos and related data, and a microprocessor for executing the programs to effect operations and controls thereof.

Prediction mode extraction unit 1510 extracts from a bitstream a prediction mode bit which is made from encoding information on the prediction mode. Here, the prediction mode information is for identifying the prediction mode of the current block that is determined by video encoding apparatus 200, and includes information on whether the prediction mode of the current block is a horizontal mode, vertical mode, or DC mode.

Bitstream identifier extraction unit 1520 extracts a macroblock mode bit in units of a macroblock, and if the prediction mode bit represents that the bitstream of the macroblock contains at least one rectangularly encoded bitstream, extracts a block mode bit in units of each subblock in the macroblock. In addition, bitstream identifier extraction unit 1520 uses so extracted macroblock mode bit and block mode bit for controlling decoding unit 1530 to output a quantized frequency coefficient string to one of rectangular reconstruction unit 1540 and square reconstruction unit 1550.

For example, if the extracted macroblock mode bit is '0', bitstream identifier extraction unit 1520 may determine that the bitstreams of all of the subblocks in the macroblock are squarely encoded bitstreams to control decoding unit 1530 to output the quantized frequency coefficient string made from decoding the bitstream to square reconstruction unit 1550. In addition, if the macroblock mode bit is '1', bitstream identifier extraction unit 1520 may extract block mode bits for the respective subblocks and use the extracted block mode bits to determine whether the bitstreams of the corresponding subblocks are either the squarely encoded bitstream or the rectangularly encoded bitstreams and thereby control decoding unit 1530 to output the quantized frequency coefficient string made from decoding the bitstreams to selected one of rectangular reconstruction unit 1540 and square reconstruction unit 1550.

In addition, if the macroblock mode bit is '1' and all of the quantized frequency coefficients outputted from decoding unit 1530 are '0', bitstream identifier extraction unit 1520 does not extract a block mode bit but controls decoding unit 1530 to output the quantized frequency coefficient string to rectangular reconstruction unit 1540.

Decoding unit 1530 decodes the bitstream to extract the quantized frequency coefficient string by respective subblocks. Decoding unit 1530, when extracting and generating the quantized frequency coefficients, generates the quantized frequency coefficients extracted in units of a subblock to one of rectangular reconstruction unit 1540 and square reconstruction unit 1550 under the control of bitstream identifier extraction unit 1520.

Rectangular reconstruction unit 1540 operates on the quantized frequency coefficients to reconstruct and output subblocks of a macroblock in units of a rectangular block successively according to the prediction mode identified by the prediction mode bit. Specifically, when the quantized frequency coefficients are received from decoding and extracting the bitstream, rectangular reconstruction unit 1540 generates the quantized residual block through an inverse scanning of the coefficients by the respective subblocks, decomposes the quantized residual block in units of a rectangular block, performs inverse quantization and inverse transform on the plurality of quantized rectangular residual block segments, successively predicts a plurality of rectangular current blocks corresponding to the plurality of inversely transformed rectangular residual block segments to generate a plurality of rectangular predicted blocks, and adds the plurality of inversely transformed rectangular residual block segments to the plurality of rectangular predicted blocks so as to reconstruct the plurality of rectangular current blocks and combine them into a reconstructed current block of the image.

Square reconstruction unit 1550 reconstructs and outputs the current block in units of a square block according to the prediction mode bit by using the quantized frequency coefficients outputted from decoding unit 1530.

Figure 16:
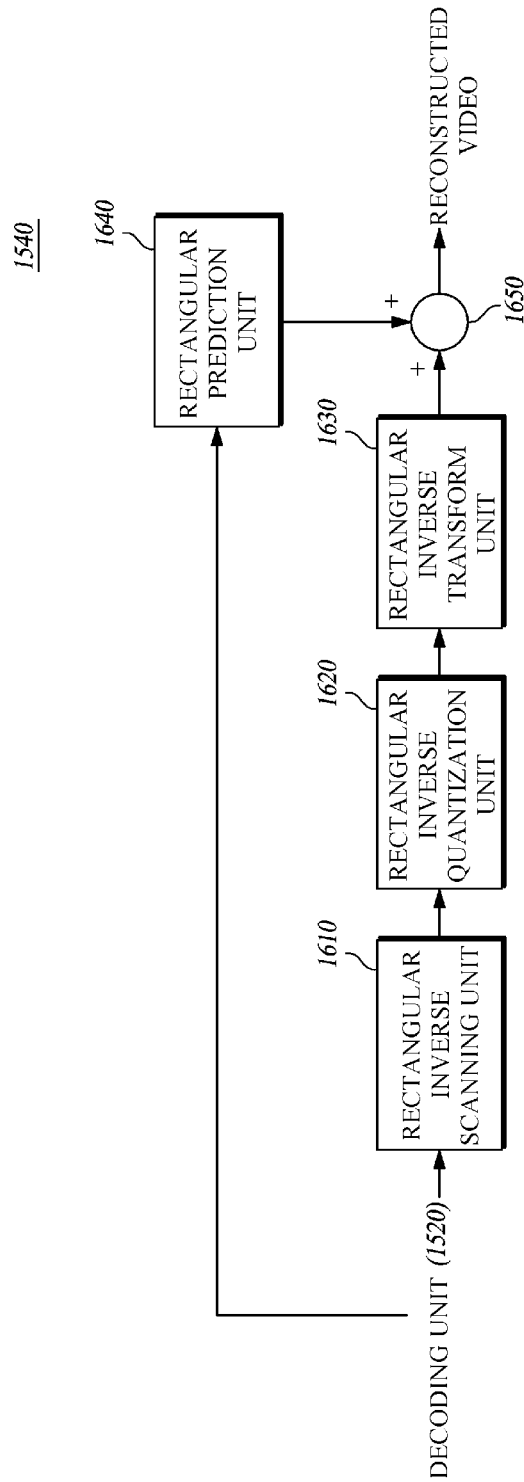
FIG. 16 is a block diagram schematically illustrating the electronic configuration of a rectangular decoding apparatus according to an aspect.

FIG. 16 is a block diagram schematically illustrating the electronic configuration of a rectangular decoding apparatus according to an aspect of the present disclosure.

The rectangular decoding apparatus according to an aspect may be implemented by rectangular reconstruction unit 1540 in FIG. 15. Hereinafter, the rectangular decoding apparatus according to an aspect will be called rectangular reconstruction unit 1540.

Rectangular reconstruction unit 1540 according to an aspect may comprise a rectangular inverse scanning unit 1610, a rectangular inverse quantization unit 1620, a rectangular inverse transform unit 1630, a rectangular prediction unit 1640, and a rectangular addition unit 1650.

When the quantized frequency coefficients are received from decoding and extracting the bitstream, rectangular inverse scanning unit 1610 inversely scans the coefficients to generate a quantized residual block, and decomposes the quantized residual block by the unit of rectangular block to output a plurality of quantized rectangular residual blocks.

Here, rectangular inverse scanning unit 1610 may scan quantized frequency coefficients by determining an initial inverse scanning pattern depending on the size of the image. For example, if the size of the image is larger than or equal to than a preset size, the initial inverse scanning pattern may be determined by assigning priorities to the coefficients of the DC component among the quantized frequency coefficients of the quantized residual block and the lowermost coefficients of the square residual block, and further by assigning a higher priority to the coefficients of the DC component. In addition, if the size of the image is smaller than the preset size, the initial inverse scanning pattern may be determined by assigning an equal priority to the coefficients of the DC component among the quantized frequency coefficients of the quantized residual block and the lowermost coefficients of the square residual block.

In addition, rectangular inverse scanning unit 1610 may depend on the probability of non-zero quantized frequency coefficients to occur at different positions of the quantized residual block in adaptively updating the inverse scanning pattern. For example, whenever the bitstream is decoded, rectangular inverse scanning unit 1610 may adaptively update the inverse scanning pattern by calculating the probability of the occurrence of non-zero quantized frequency coefficients at different positions of the quantized residual block and determining the inverse scanning order in descending order of that probability.

Rectangular inverse quantization unit 1620 inversely quantizes the plurality of quantized rectangular residual blocks. Rectangular inverse transform unit 1630 inversely transforms the plurality of inversely quantized rectangular residual blocks into a time domain.

Rectangular prediction unit 1640 successively predicts the plurality of rectangular current blocks corresponding to the plurality of inversely transformed rectangular residual blocks to generate a plurality of rectangular predicted blocks. Here, rectangular prediction unit 1640 successively predicts the plurality of rectangular current blocks in the prediction direction according to the prediction mode extracted from the bitstream.

Rectangular addition unit 1650 adds the plurality of inversely transformed rectangular residual blocks to the plurality of rectangular predicted blocks in order to reconstruct the plurality of rectangular current blocks and thereby reconstructs the video images and outputs the reconstructed video.

When the quantized frequency coefficients are received from decoding and extracting the bitstream, such described rectangular reconstruction unit 1540 generates the quantized residual block through the inverse scanning of the coefficients, decomposes the quantized residual block by the unit of rectangular block to output the plurality of quantized rectangular residual blocks, performs the inverse quantization on the plurality of quantized rectangular residual blocks and the inverse transform on the plurality of inversely quantized rectangular residual blocks, successively predicts the plurality of rectangular current blocks corresponding to the plurality of inversely transformed rectangular residual block segments to generate the plurality of rectangular predicted blocks, and adds the plurality of inversely transformed rectangular residual blocks to the plurality of rectangular predicted blocks so as to reconstruct the plurality of rectangular current blocks and combine them into the reconstructed image.

Figure 17:
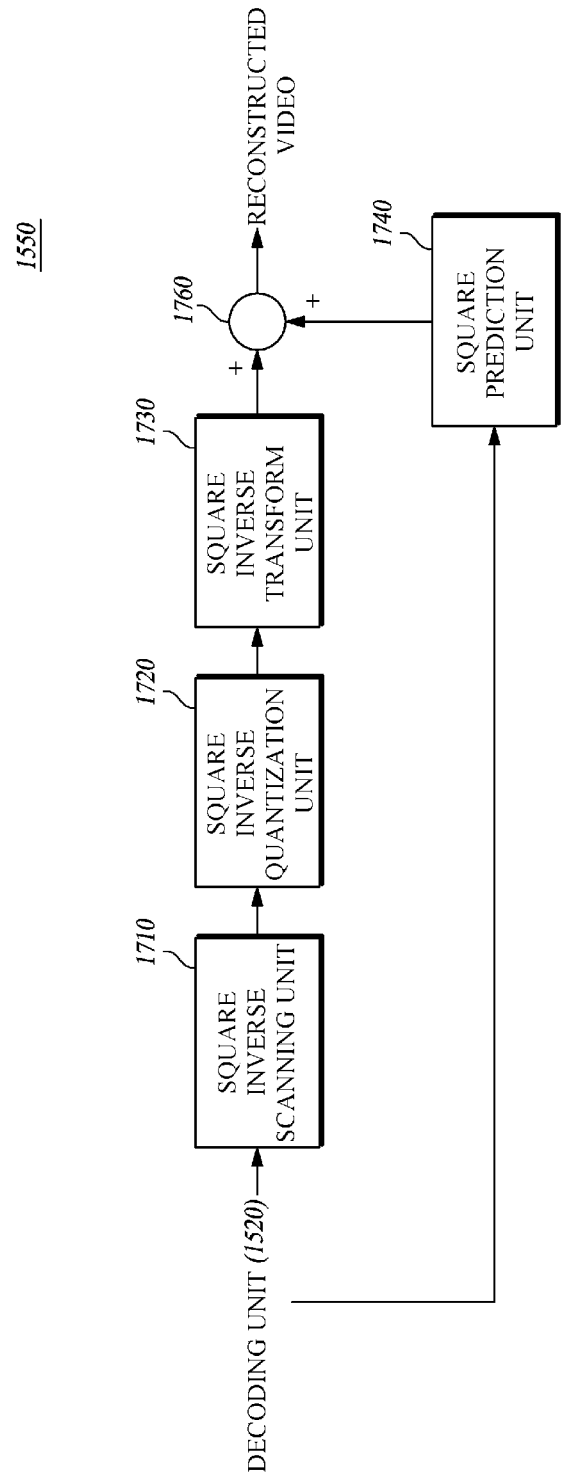
FIG. 17 is a block diagram schematically illustrating the electronic configuration of a square encoding apparatus according to an aspect.

FIG. 17 is a block diagram schematically illustrating the electronic configuration of a square decoding apparatus according to an aspect of the present disclosure.

The square decoding apparatus according to an aspect may be implemented by square reconstruction unit 1550. Hereinafter, the square decoding apparatus according to an aspect will be called square reconstruction unit 1550.

Square reconstruction unit 1550 may comprise a square inverse scanning unit 1710, a square inverse quantization unit 1720, a square inverse transform unit 1730, a square prediction unit 1740, and a square addition unit 1750.

Square inverse scanning unit 1710 inversely scans the quantized frequency coefficient string outputted from decoding unit 1520 to generate a quantized square residual block.

At this time, square inverse scanning unit 1710 may adaptively update the scanning pattern in the process of encoding.

Square inverse quantization unit 1720 performs inverse quantization on the quantized square residual blocks. Square inverse transform unit 1730 performs inverse transform on the inversely quantized square residual blocks into a time domain.

Square prediction unit 1740 predicts the square current blocks corresponding to the inversely transformed square residual blocks to generate square predicted blocks. Here, square prediction unit 1740 predicts the square current blocks in the prediction direction according to the prediction mode extracted from the bitstream.

Square addition unit 1750 adds the inversely transformed square residual blocks to the square predicted blocks to reconstruct the square current blocks and thereby reconstructs the video images and outputs the reconstructed video.

Figure 18:
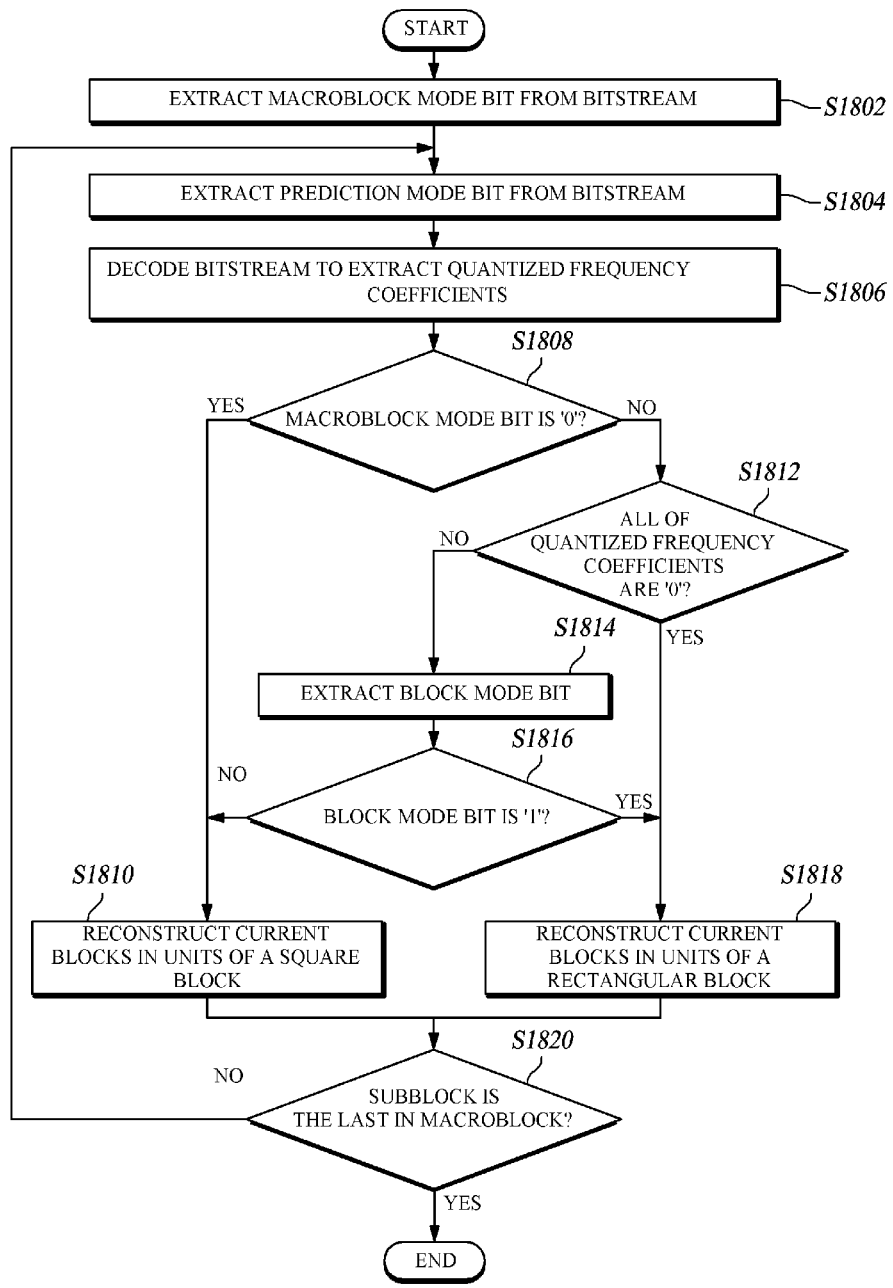
FIG. 18 is a flowchart illustrating a video decoding method according to an aspect.

FIG. 18 is a flowchart illustrating a video decoding method according to an aspect of the present disclosure.

Video decoding apparatus 1500, which has received and stored the bitstream of the video through a communication network or cable, is adapted to reconstruct the video according to a user's selection or an algorithm of a running program by extracting a macroblock mode bit and a block mode bit from the bitstream, extracting a prediction mode bit from the bitstream, decoding the bitstream to extract quantized frequency coefficients by respective subblocks, and based on the extracted macroblock mode bit and the extracted block mode bit, using the quantized frequency coefficients extracted by the respective subblocks to reconstruct and output subblocks of a macroblock in units of a rectangular block successively according to a prediction mode identified by the prediction mode bit or using the quantized frequency coefficients extracted by the respective subblocks to reconstruct and output the subblocks of the macroblock in units of a square block according to the prediction mode identified by the prediction mode bit.

To this end, video decoding apparatus 1500 extracts a macroblock mode bit from the bitstream (step S1802), extracts a prediction mode bit from the bitstream (step S1804), and decodes the bitstream to extract quantized frequency coefficients (step S1806). The bitstream in steps S1802 and S1804 for extracting the macroblock mode bit and prediction mode bit belongs to the current macroblock to decode, and the bitstream in step S1806 being subjected to decoding for extracting the quantized frequency coefficients belongs to a current subblock to decode within the macroblock or a current block.

Video decoding apparatus 1500, which has extracted the quantized frequency coefficients by the respective subblocks, operates based on the macroblock mode bit extracted in step S1802 to use the quantized frequency coefficients extracted in step S1806 for reconstructing and outputting the current blocks in units of a rectangular block successively or to use the quantized frequency coefficients for reconstructing and outputting the current blocks in units of a square block.

For example, video decoding apparatus 1500 confirms if the macroblock mode bit is valued '0' (S1808), and if yes, determines that the bitstreams of the entire subblocks in a macroblock are square bitstreams and uses the quantized frequency coefficients for reconstructing and outputting the current blocks in units of a square block (S1810).

In addition, video decoding apparatus 1500, in response to step S1808 deciding that the macroblock mode bit is not '0' but '1', determines whether the quantized frequency coefficients of the current block are entirely '0' (S1812), and if the entirety but at least one of the quantized frequency coefficients are not '0', extracts a block mode bit from the bitstream (S1814) and determines if the block mode bit is "1" (S1816).

If step S1816 decides that the block mode bit is not '1' but '0', video decoding apparatus 1500 identifies the current block bitstream being the squarely encoded bitstream and proceeds to step S1810 for using the quantized frequency coefficients to reconstruct and output the current blocks in units of a square block. If step S1816 decides that the block mode bit is '1', video decoding apparatus 1500 determines that the current block bitstream is the rectangularly encoded bitstream and uses the quantized frequency coefficients to reconstruct and output the current blocks in units of a rectangular block (S1818).

If step S1812 decides that the quantized frequency coefficients are entirely '0', instead of taking steps S1814 and S1816 for extracting the block mode bit and accordingly selecting between the reconstruction in units of a square block and the reconstruction in units of a rectangular block, video decoding apparatus 1500 bypasses extracting the block mode bit toward step S1818 for using the quantized frequency coefficients to reconstruct and output the current blocks in units of a rectangular block.

Video decoding apparatus 1500, which has reconstructed the current subblock to decode within the macroblock or the current block, determines whether the reconstructed current block is the last subblock within the macroblock (S1820), and if no, sets the next subblock as the current block and proceeds to step S1804 and through step S1818 until the current block becomes the last subblock within the macroblock, whereby carrying out the decoding process with respect to the entire subblocks in the macroblock.

Figure 19:
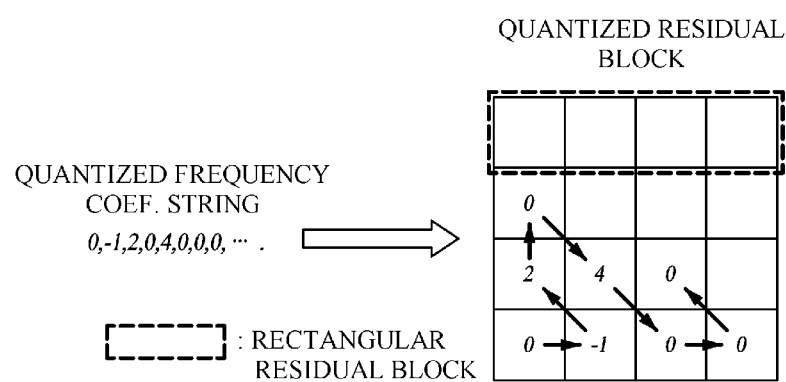
FIG. 19 is an exemplary diagram illustrating an inverse scanning process in an initial inverse scanning pattern according to an aspect.

FIG. 19 is an exemplary diagram illustrating an inverse scanning process according to an initial inverse scanning pattern according to an aspect of the present disclosure.

Video decoding apparatus 1500 determines the initial inverse scanning pattern depending on the size of an image, and configures the quantized residual block by inversely scanning the quantized frequency coefficient string according to the initial inverse scanning pattern. Illustrated in FIG. 19 is a process of inverse scanning the quantized frequency coefficient string according to the determined initial inverse scanning pattern in the case where the quantized frequency coefficient string is "0, −1, 2, 0, 4, 0, 0, 0, . . . ", the image size is CIF, the block mode is sized 4×4, and the prediction mode is a vertical mode.

The determination of the initial inverse scanning pattern by the image size is similar to that of the initial scanning pattern as described above with reference to FIG. 13. In other words, the probability of the occurrence of non-zero values in the quantized frequency coefficients of the square residual block varies by the image size, and if the size of the video gets larger, the probability of the occurrence of non-zero values in the coefficients of the DC component becomes higher than the probability of the occurrence of non-zero values in the coefficients in the lowermost portion, whereby the initial scanning pattern is characteristically determined according to the size of the image.

For example, with a threshold size preset for comparing an image, the initial inverse scanning pattern may be determined in a manner responsive to an image sized larger than or equal to the preset size of arranging the quantized frequency coefficients read in successively from the quantized frequency coefficient string with priorities given to the positions corresponding to the coefficients of the DC component among the respective positions of the quantized frequency coefficients of the quantized residual block and to the positions corresponding to the lowermost coefficients of the quantized residual block and further by giving a higher priority to the positions of the coefficients of the DC component. In addition, if the image is smaller than the preset size, the initial reverse scanning pattern may be determined by assigning the equal priority to the positions corresponding to the coefficients of the DC component among the respective positions corresponding to the quantized frequency coefficients of the quantized residual block and to the positions corresponding to the lowermost coefficients of the square residual block.

In the example of FIG. 19, if the preset size is 720p and the size of the image is CIF meaning the image is smaller than the preset size, then an inverse scanning may be performed with an equal priority given to the positions corresponding to the coefficients of the DC component and the positions corresponding to the lowermost coefficients in order to obtain the quantized residual block as illustrated.

Further, when the inversely scanned and then quantized residual block is composed, it is decomposed into a number of segments in the vertical direction that is the prediction direction of the prediction mode of the current block to generate the plurality of rectangular residual block segments.

Figure 20:
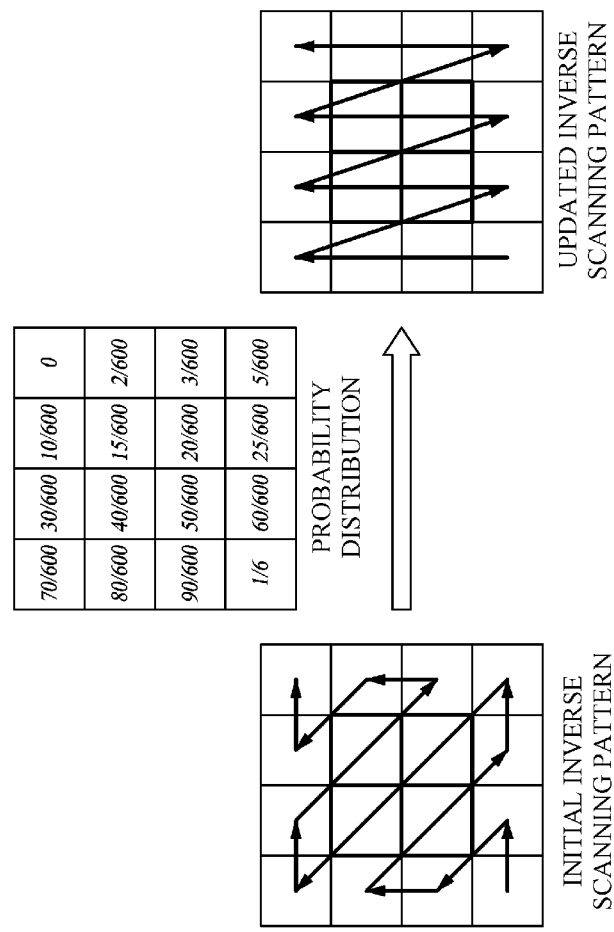
FIG. 20 is an exemplary diagram illustrating a process of updating an inverse scanning pattern according to an aspect.

FIG. 20 is an exemplary diagram illustrating a process of updating an inverse scanning pattern according to an aspect of the present disclosure.

Similar to updating the scanning pattern in the video encoding apparatus 200, video decoding apparatus 1500 may also update the inverse scanning pattern. In other words, inverse scanning is performed at every block decoding not by using the initially determined inverse scanning pattern but with the inverse scanning pattern updated adaptively.

At this time, the criterion of updating the inverse scanning pattern is similar to that of updating the scanning pattern. That is, the criterion may be the probability of the occurrence of non-zero quantized frequency coefficients at each position of the quantized residual block. For example, at every decoding over the plurality of image blocks, the inverse scanning pattern may be adaptively updated by calculating the probability of the occurrence of non-zero quantized frequency coefficients at the respective positions of the quantized residual block and determining the inverse scanning in a descending order of the probability.

Figure 21:
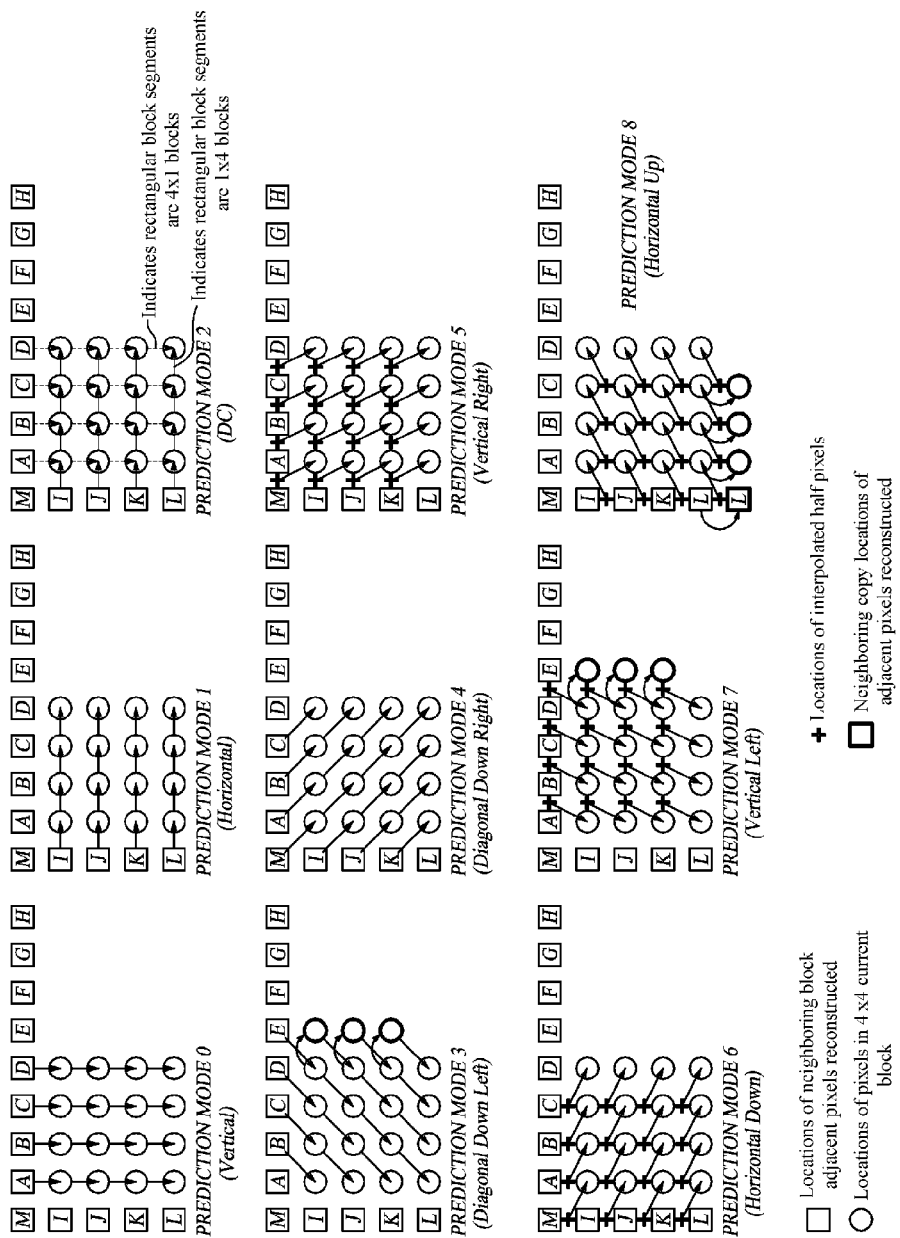
FIG. 21 is a diagram illustrating a process of predicting current rectangular blocks decomposed according to an aspect.

FIG. 21 is a diagram illustrating a process of predicting rectangular current blocks decomposed according to an aspect.

As shown in FIG. 21, used to predict the rectangular current blocks are integer pixels selected in the prediction direction as being located nearest to rectangular current block pixels among neighboring pixels of the reconstructed neighboring blocks, or if half pixels of the reconstructed integer pixels are closest to the current block pixels, the reconstructed integer pixels are first interpolated and the interpolated half pixels are used for the prediction.

As described, the prediction of the rectangular current block segments from the square current block may be called a one-dimensional subblock prediction. In other words, the rectangular blocks such as 1×4 blocks are predicted one-dimensionally when compared with the square block such as 4×4 block is predicted two-dimensionally. In addition, the predicted blocks through the one-dimensional prediction or two-dimensional prediction as described are transformed respectively through a one-dimensional transform or two-dimensional transform, and therefore an aspect of the present disclosure may adaptively select between the one-dimensional transform and two-dimensional transform in encoding the image blocks.

FIG. 22 is a diagram illustrating a process of predicting the rectangular block by using half pixels according to another aspect.

The following illustrates predicting the current block by using prediction No. 5 illustrated in FIG. 21 and explains a process of predicting the respective rectangular block segments from the current block by steps 1 through 4.

In step 1, adjacent pixels (M, A, B, C, D), which are integer pixels of an adjacent block (4×4 block) having been reconstructed through encoding and decoding prior to the current block (4×4 block), are used to generate pixels at half pixel positions, first rectangular current block pixels, i.e. first row pixels (P0, P1, P2, P3) of the square current block are predicted by using the pixels at the positions of the half pixels generated. With respect to the predicted first row pixels (P0, P1, P2, P3), they undergo an one-dimensional integer transform and quantization processes and their inverse processes (i.e., inverse quantization process and inverse transform prediction) to generate reconstructed pixels (R0, R1, R2, R3) for the first row. For additional reference, since the one-dimensional encoding, which involves prosecution of the one-dimensional integer transform and quantization processes and their inverse processes as described, only permits an entropy encoding process to be carried out by combining four rectangular blocks into a square block such as the 4×4 block, there is no concern of a causality problem regarding cause and effect of encoding.

In step 2, by using first rectangular current block pixels reconstructed i.e. the reconstructed pixels (R0, R1, R2, R3) on the first row of the square current block and an adjacent pixel (I) that is an integer pixel of the adjacent block reconstructed previously, first row half pixels of the square current block are generated; by using the first row half pixels generated, second rectangular current block pixels, i.e. a second row of pixels (P4, P5, P6, P7) of the square current block are predicted; and with respect to the predicted second row pixels (P4, P5, P6, P7), the one-dimensional integer transform and quantization processes and their inverse processes are carried out to generate reconstructed pixels (R4, R5, R6, R7) on the second row.

In step 3, by using second rectangular current block pixels reconstructed i.e. the reconstructed pixels (R4, R5, R6, R7) on the second row of the square current block and an adjacent pixel (J) that is an integer pixel of the adjacent block reconstructed previously, second row half pixels of the square current block are generated; by using the second row half pixels generated, third rectangular current block pixels, i.e. a third row of pixels (P8, P9, P10, P11) of the square current block are predicted; and with respect to the predicted third row pixels (P8, P9, P10, P11), the one-dimensional integer transform and quantization processes and their inverse processes are carried out to generate reconstructed pixels (R8, R9, R10, R11) on the third row.

In step 4, by using third rectangular current block pixels reconstructed i.e. the reconstructed pixels (R8, R9, R10, R11) on the third row of the square current block and an adjacent pixel (K) that is an integer pixel of the adjacent block reconstructed previously, third row half pixels of the square current block are generated; by using the third row half pixels generated, fourth rectangular current block pixels, i.e. a fourth row of pixels (P12, P13, P14, P15) of the square current block are predicted; and with respect to the predicted fourth row pixels (P12, P13, P14, P15), the one-dimensional integer transform and quantization processes and their inverse processes are carried out to generate reconstructed pixels (R12, R13, R14, R15) on the fourth row.

As described, rectangular prediction unit 492 of video encoding apparatus 200 and rectangular prediction unit 1640 of video decoding apparatus 1500 predict the number of rectangular current block segments of the current block in the successive manner or go through non-simultaneous predictions of the rectangular current block segments by stepwise use of previous reconstructions of encoded rectangular block pixels.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in parts or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. The computer readable media may include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined otherwise. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are practicable without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of video compression technique at encoding or decoding images for selectively determining the coding schemes toward more accurate predictions and thereby improves the video coding efficiency.

The invention claimed is:

1. An apparatus for encoding an intra block in a square shape, the apparatus comprising:
   a rectangular encoder configured to
      decompose the intra block into a plurality of rectangular subblocks based on an intra prediction direction of an intra prediction mode of the intra block, and
      sequentially encode the plurality of rectangular subblocks according to the same intra prediction mode as the intra prediction mode of the intra block to generate a rectangularly encoded bitstream of the intra block by
         predicting a rectangular subblock of the plurality of rectangular subblocks according to the intra prediction mode of the intra block by using neighboring pixels adjacent to the rectangular subblock to generate a rectangular predicted subblock corresponding to the rectangular subblock, and encoding the rectangular subblock by using the rectangular predicted subblock, wherein one or more encoded pixels in the encoded rectangular subblock are used as part of neighboring pixels for predicting at least one non-encoded rectangular subblock adjacent to the encoded rectangular subblock;

a square encoder configured to encode the intra block according to the intra prediction mode of the intra block to generate a squarely encoded bitstream of the intra block; and an encoding selector configured to select one of the square encoder and the rectangular encoder to generate an encoded bitstream of the intra block by encoding the intra block into either the squarely encoded bitstream or the rectangularly encoded bitstream, and encode mode information on the intra prediction mode and a block mode of the intra block, wherein the block mode represents the selected encoded bitstream among the squarely encoded bitstream and the rectangularly encoded bitstream.

2. The apparatus of claim 1, wherein the encoding selector comprises:

a first temporary buffer, a second temporary buffer, a bitstream buffer, and a bitstream selection unit configured to store the squarely encoded bitstream into the first temporary buffer for each of intra blocks included in a macroblock, store the selected encoded bitstream into the second temporary buffer for each of the intra blocks, and store either (i) a first bitstream stored in the first temporary buffer or (ii) a second bitstream stored in the second temporary buffer into the bitstream buffer, according to a first cost of encoding the macroblock into the first bitstream and a second cost of encoding the macroblock into the second bitstream.

3. The apparatus of claim 2, wherein the bitstream selection unit is configured to, for each of the intra blocks, calculate a square encoding cost for encoding each of the intra blocks into a squarely encoded bitstream, calculate a rectangular encoding cost for encoding each of the intra blocks into a rectangularly encoded bitstream of each of the intra blocks, and store the squarely encoded bitstream of each of the intra blocks into the second temporary buffer when the squarely encoded bitstream of each of the intra blocks has at least one non-zero quantized frequency coefficient, and the square encoding cost is lower than the rectangular encoding cost.

4. The apparatus of claim 3, wherein the mode information includes:

information on the intra prediction mode of the intra block, and information on the block mode of the intra block.

5. The apparatus of claim 2, wherein the bitstream selection unit is configured to, for each of the intra blocks, calculate a square encoding cost for encoding each of the intra blocks into a squarely encoded bitstream, calculate a rectangular encoding cost for encoding each of the intra blocks into a rectangularly encoded bitstream, and store the rectangularly encoded bitstream of each of the intra blocks into the second temporary buffer, when (a) all quantized frequency coefficients of the squarely encoded bitstream of each of the intra blocks are zero, or (b) the square encoding cost is not lower than the rectangular encoding cost.

6. The apparatus of claim 2, wherein the bitstream selection unit is configured to store the first bitstream stored in the first temporary buffer into the bitstream buffer as a bitstream of the macroblock, when the first cost is lower than the second cost.

7. The apparatus of claim 6, wherein, when the first bitstream is stored in the bitstream buffer as the bitstream of the macroblock, the bitstream selection unit is configured to generate a macroblock mode representing that the bitstream of the macroblock does not include any rectangularly encoded bitstream, and store the macroblock mode into the bitstream buffer.

8. The apparatus of claim 2, wherein the bitstream selection unit is configured to store the second bitstream stored in the second temporary buffer into the bitstream buffer as a bitstream of the macroblock, when the first cost is higher than or equal to the second cost.

9. The apparatus of claim 8, wherein, when the second bitstream is stored in the bitstream buffer as the bitstream of the macroblock, the bitstream selection unit is configured to generate a macroblock mode representing that the bitstream of the macroblock includes at least one rectangularly encoded bitstream, and store the macroblock mode into the bitstream buffer.

10. The apparatus of claim 1, wherein when a size of the intra block is N×N, a size of each rectangular subblock of the plurality of rectangular subblocks is determined as N×1 or 1×N depending on the intra prediction direction of the intra prediction mode of the intra block.

11. A method for encoding an intra block in a square shape, the method comprising:

encoding a rectangularly encoded bitstream of the intra block by decomposing the intra block into a plurality of rectangular subblocks based on an intra prediction direction of an intra prediction mode of the intra block, and sequentially encoding the plurality of rectangular subblocks according to the same intra prediction mode as the intra prediction mode of the intra block to generate the rectangularly encoded bitstream of the intra block by predicting a rectangular subblock of the plurality of rectangular subblocks according to the intra prediction mode of the intra block by using neighboring pixels adjacent to the rectangular subblock to generate a rectangular predicted subblock corresponding to the rectangular subblock, encoding the rectangular subblock by using the rectangular predicted subblock, wherein one or more encoded pixels in the encoded rectangular subblock are used as part of neighboring pixels for predicting at least one non-encoded rectangular subblock adjacent to the encoded rectangular subblock;

generating a squarely encoded bitstream of the intra block by performing an encoding of the intra block according to the intra prediction mode of the intra block;

selecting an encoded bitstream of the intra block among the squarely encoded bitstream of the intra block and the rectangularly encoded bitstream of the intra block; and encoding mode information on the intra prediction mode and a block mode of the intra block, wherein the block mode represents the selected encoded bitstream among the squarely encoded bitstream and the rectangularly encoded bitstream.

12. An apparatus for decoding an intra block in a square shape, the apparatus comprising:
    an extraction unit configured to extract mode information on an intra prediction mode of the intra block and a block mode of the intra block from a bitstream, wherein the block mode of the intra block indicates that the intra block is encoded into a squarely encoded bitstream or a rectangularly encoded bitstream;
    a decoding unit configured to extract quantized frequency coefficients of the intra block by decoding the bitstream based on the block mode of the intra block;
    a rectangular reconstruction unit configured to
        identify a plurality of rectangular subblocks of the intra block based on an intra prediction direction of the intra prediction mode of the intra block, and
        sequentially reconstruct the plurality of rectangular subblocks according to the same intra prediction mode as the intra prediction mode of the intra block by
            predicting a rectangular subblock of the plurality of rectangular subblocks based on the intra prediction mode of the intra block by using neighboring pixels adjacent to the rectangular subblock to generate a rectangular predicted subblock corresponding to the rectangular subblock, and
            reconstructing the rectangular subblocks by adding the rectangular predicted subblock and a rectangular residual subblock which corresponds thereto and is obtained from the quantized frequency coefficients,
        wherein one or more pixels in the reconstructed rectangular subblock are used as part of neighboring pixels for predicting at least one non-reconstructed rectangular subblock adjacent to the reconstructed rectangular subblock; and
    a square reconstruction unit configured to
        predict the intra block based on the intra prediction mode without partitioning the intra block into the rectangular subblocks, and
        reconstruct the intra block by using the predicted intra block and the quantized frequency coefficients,
    wherein the extraction unit is configured to control the decoding unit to provide the quantized frequency coefficients to either the rectangular reconstruction unit or the square reconstruction unit according to the block mode.

13. The apparatus of claim 12, wherein the extraction unit is further configured to extract a macroblock mode of a macroblock from the bitstream, each of intra blocks being a subblock of the macroblock,
    wherein the extraction unit is configured to control the decoding unit to provide the quantized frequency coefficients to the square reconstruction unit for each of the intra blocks when the macroblock mode represents that a bitstream corresponding to the macroblock does not include a rectangularly encoded bitstream.

14. The apparatus of claim 12, wherein the extraction unit is further configured to extract a macroblock mode of a macroblock from the bitstream, each of intra blocks being a subblock of the macroblock,
    wherein the extraction unit is configured to control the decoding unit to provide the quantized frequency coefficients to the rectangular reconstruction unit for each of the intra blocks, in case that
        the macroblock mode represents that a bitstream corresponding to the macroblock includes at least one rectangularly encoded bitstream, and
        the quantized frequency coefficients of each of the intra blocks are entirely zero.

15. The apparatus of claim 12, wherein the extraction unit is further configured to extract a macroblock mode of a macroblock from the bitstream, each of intra blocks being a subblock of the macroblock,
    wherein the extraction unit is configured to extract a block mode for each of intra blocks, in case that
        the macroblock mode represents that a bitstream corresponding to the macroblock includes at least one rectangularly encoded bitstream, and
        at least one of the quantized frequency coefficients of each of the intra blocks is non-zero.

16. The apparatus of claim 12, wherein the extraction unit is further configured to extract a macroblock mode of a macroblock from the bitstream, each of intra blocks being a subblock of the macroblock,
    wherein the extraction unit is configured to control the decoding unit to provide the quantized frequency coefficients of each of the intra blocks to the rectangular reconstruction unit, in case that
        the macroblock mode represents that a bitstream corresponding to the macroblock includes at least one rectangularly encoded bitstream,
        the quantized frequency coefficients of each of the intra blocks are not entirely zero, and
        a block mode of each of the intra blocks represents that each of the intra blocks is encoded into a rectangularly encoded bitstream.

17. The apparatus of claim 12, wherein the extraction unit is further configured to extract a macroblock mode of a macroblock from the bitstream, each of intra blocks being a subblock of the macroblock,
    wherein the extraction unit is configured to control the decoding unit to provide the quantized frequency coefficients of each of the intra blocks to the square reconstruction unit, in case that
        the macroblock mode represents that a bitstream corresponding to the macroblock includes at least one rectangularly encoded bitstream, and
        the quantized frequency coefficients of each of the intra blocks are not entirely zero, and a block mode of each of the intra blocks represents that each of the intra blocks is encoded into a squarely encoded bitstream.

18. A method for decoding an intra block in a square shape, the method comprising:
    extracting mode information on an intra prediction mode of the intra block and a block mode of the intra block from a bitstream wherein the block mode of the intra block indicates that the intra block is encoded into a squarely encoded bitstream or a rectangularly encoded bitstream;
    extracting quantized frequency coefficients of the intra block from the bitstream based on the block mode of the intra block;
    when the block mode of the intra block indicates a first mode,
        identifying a plurality of rectangular subblocks of the intra block based on an intra prediction direction of the intra prediction mode of the intra block,
        sequentially reconstructing the plurality of rectangular subblocks according to the same intra prediction mode as the intra prediction mode of the intra block by predicting a rectangular subblock of the plurality of rectangular subblocks based on the intra prediction mode of the intra block by using neighboring pixels adjacent to the rectangular subblock to generate rectangular predicted subblock corresponding to the rectangular subblock, and reconstructing the rectangular subblock by adding the rectangular predicted subblock and a rectangular residual subblock which corresponds thereto and is obtained from the quantized frequency coefficients, wherein one or more pixels in the reconstructed rectangular subblock are used as part of neighboring pixels for predicting at least one non-reconstructed rectangular subblock adjacent to the reconstructed rectangular subblock; and when the block mode of the intra block indicates a second mode, predicting the intra block based on the intra prediction mode without partitioning the intra block into the rectangular subblocks, and reconstructing the intra block by using the predicted intra block and the quantized frequency coefficients.

* * * * *